(12) United States Patent
Hori

(10) Patent No.: US 8,514,513 B2
(45) Date of Patent: Aug. 20, 2013

(54) LIBRARY APPARATUS AND METHOD FOR CONTROLLING CONVEYING OF STORAGE MEDIUM

(75) Inventor: Daisuke Hori, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/608,636

(22) Filed: Sep. 10, 2012

(65) Prior Publication Data

US 2013/0083642 A1    Apr. 4, 2013

(30) Foreign Application Priority Data

Sep. 29, 2011    (JP) .................................. 2011-215117

(51) Int. Cl.
    *G11B 15/68*    (2006.01)
(52) U.S. Cl.
    USPC ........................................................ 360/92.1
(58) Field of Classification Search
    USPC .................................. 360/92.1, 91; 369/75.1
    See application file for complete search history.

(56) References Cited

U.S. PATENT DOCUMENTS

| | | | |
|---|---|---|---|
| 5,715,229 A * | 2/1998 | Kim et al. | 369/30.92 |
| 7,387,485 B2 * | 6/2008 | Dickey et al. | 414/277 |
| 7,889,455 B2 * | 2/2011 | Schultz | 360/92.1 |
| 8,264,791 B2 * | 9/2012 | Green et al. | 360/92.1 |
| 8,339,729 B2 * | 12/2012 | Thompson et al. | 360/92.1 |
| 2005/0197736 A1 | 9/2005 | Hanagata | |
| 2007/0196197 A1 | 8/2007 | Ishiyama | |

FOREIGN PATENT DOCUMENTS

| | | |
|---|---|---|
| JP | 2000-285566 | 10/2000 |
| JP | 2005-251350 | 9/2005 |
| JP | 2007-226873 | 9/2007 |

* cited by examiner

*Primary Examiner* — Allen T Cao
(74) *Attorney, Agent, or Firm* — Staas & Halsey LLP

(57) ABSTRACT

There is provided a library apparatus that including a storage rack configured to store a plurality of storage media, a recording-reproducing device configured to perform writing of data to the storage media and reading of data from the storage media, a first movement device configured to include, a first attachment-detachment mechanism that inserts a storage medium to and extracts the storage medium from the storage rack or the recording-reproducing device, a first driving unit that supplies first driving force to the first attachment-detachment mechanism, and a first coupling unit that transmits second driving force to the first attachment-detachment mechanism, and a second movement device configured to include, a second coupling unit that transmits third driving force to the first coupling unit when the second coupling unit is coupled with the first coupling unit, and a second driving unit that supplies fourth driving force to the second coupling unit.

12 Claims, 34 Drawing Sheets

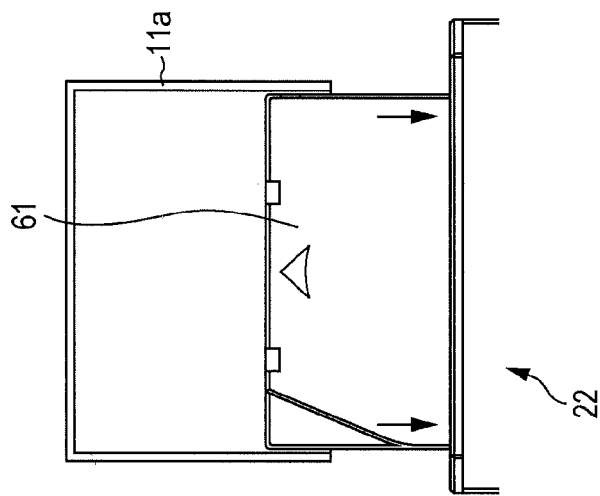
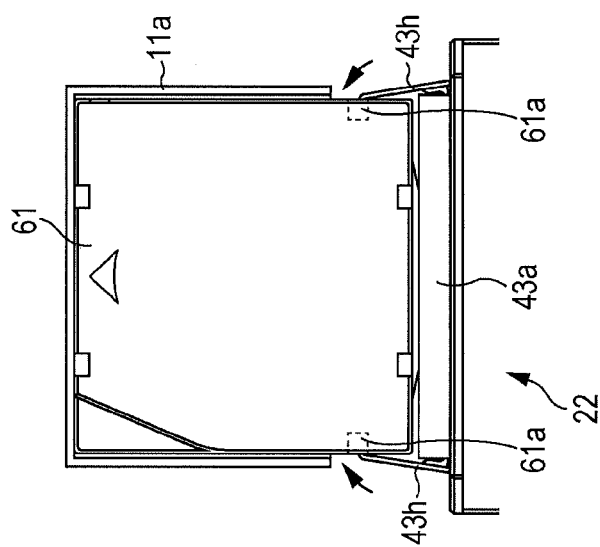
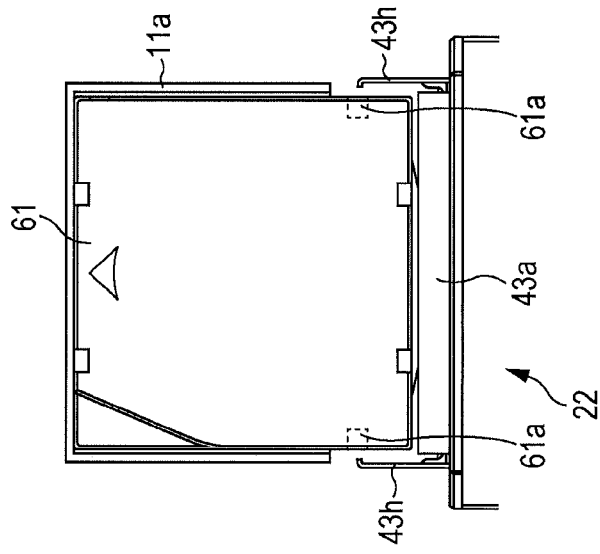

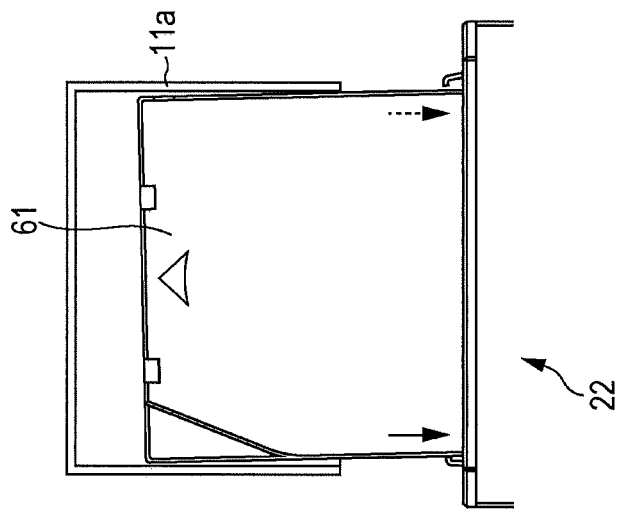
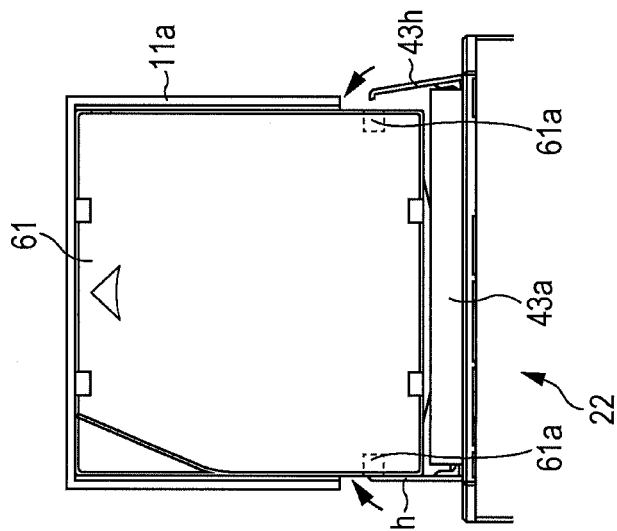
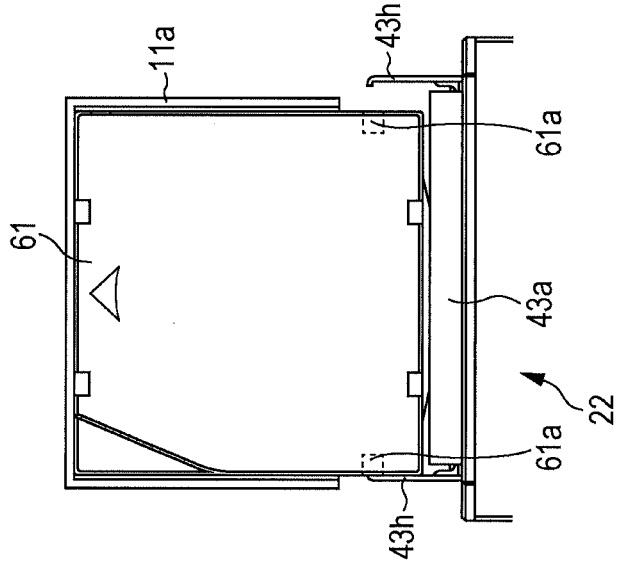

LIBRARY APPARATUS AND METHOD FOR CONTROLLING CONVEYING OF STORAGE MEDIUM

CROSS-REFERENCE TO RELATED APPLICATION

This application is based upon and claims the benefit of priority of the prior Japanese Patent Application No. 2011-215117, filed on Sep. 29, 2011, the entire contents of which are incorporated herein by reference.

FIELD

The embodiments discussed herein are related to a library apparatus and a method for controlling conveying of a storage medium.

BACKGROUND

In general, a library apparatus includes a storage rack which stores, for example, hundreds of storage media such as magnetic tapes and optical discs and a drive which writes data to the storage media and reads data from the storage media.

The library apparatus is provided with a conveying robot which conveys a storage medium in a housing. The conveying robot extracts a storage medium from the storage rack so as to convey the storage medium to the drive or conveys a storage medium received from the drive to the storage rack so as to store the storage medium in the storage rack. As described above, since a storage medium is automatically conveyed between the storage rack and the drive by the conveying robot in the library apparatus, writing of data to the storage media stored in the storage rack and reading of data from the storage media are automatically performed.

Furthermore, some library apparatuses have two conveying robots which independently move in case of a failure of one of the conveying robots. Furthermore, in some of such library apparatuses, when one of the conveying robots fails, the other conveying robot moves the failed conveying robot to an escape area so that the failed conveying robot does not disturb conveying of storage media. Thereafter, the conveying robot which does not fail conveys the storage media until the failed robot has been repaired and recovered by a maintenance worker.

The related arts are disclosed in Japanese Laid-open Patent Publication Nos. 2005-251350, 2000-285566, and 2007-226873.

SUMMARY

According to an aspect of the invention, a library apparatus includes a storage rack configured to store a plurality of storage media, a recording-reproducing device configured to perform writing of data to the storage media and reading of data from the storage media, a first movement device configured to include, a first attachment-detachment mechanism that inserts a storage medium to and extracts the storage medium from the storage rack or the recording-reproducing device, a first driving unit that supplies first driving force to the first attachment-detachment mechanism, and a first coupling unit that transmits second driving force to the first attachment-detachment mechanism, and a second movement device configured to include, a second coupling unit that transmits third driving force to the first coupling unit when the second coupling unit is coupled with the first coupling unit, and a second driving unit that supplies fourth driving force to the second coupling unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 23A to 23C are diagrams illustrating an operation of extracting a storage medium performed by the first hand unit according to the second embodiment;

FIGS. 24A to 24C are diagrams illustrating another operation of extracting a storage medium performed by the first hand unit according to the second embodiment;

DESCRIPTION OF EMBODIMENTS

However, even in a case where a library apparatus has two conveying robots, when one of the conveying robots stops in a state in which a storage medium is positioned between the conveying robot and a storage rack, for example, operation of the library apparatus is not continued. This happens when one of the conveying robots fails to extract a storage medium from the storage rack or when a driving mechanism of one of the conveying robots fails, for example. Furthermore, when one of the conveying robots which does not fail attempts to move the stopped conveying robot to an escape area, the storage medium may be blocked by the storage rack and the storage medium may be broken.

It is desirable to provide a library apparatus in which capability of recovery from a failure of conveying of a storage medium is improved.

Hereinafter, embodiments will be described with reference to the accompanying drawings.

First Embodiment

A library apparatus according to a first embodiment includes a storage rack which stores a plurality of storage media such as magnetic tapes and optical discs and a recording/reproducing device which writes data to the storage media and read data from the storage media. The library apparatus further includes a conveying gap through which the storage media are conveyed between the storage rack and the recording/reproducing device and includes first and second movement devices which move in the conveying gap.

The first movement device normally conveys the storage media, for example. On the other hand, the second movement device is located in an escape area far from the first movement device, for example, so as not to disturb conveying of the storage media. When a failure occurs in conveying of a storage medium, the first and second movement devices are coupled with each other.

Figure 1A:
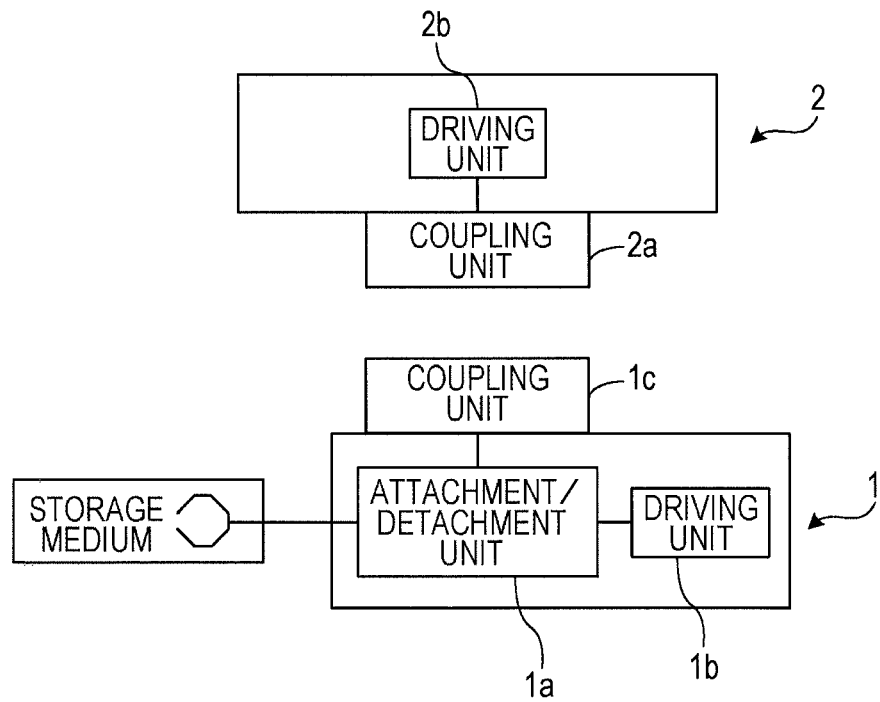
FIGS. 1A and 1B are diagrams illustrating movement devices according to a first embodiment.
Figure 1B:
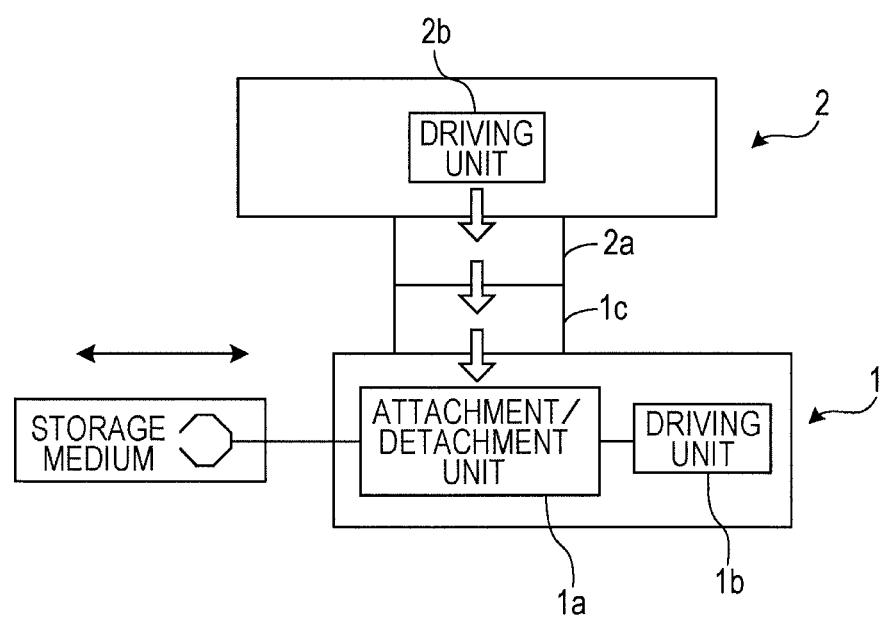

FIGS. 1A and 1B are diagrams illustrating movement devices according to the first embodiment. FIG. 1A illustrates a first state in which first and second movement devices 1 and 2 are separated from each other and FIG. 1B illustrates a second state in which the first and second movement devices 1 and 2 are coupled with each other.

The first movement device 1 includes an attachment/detachment unit 1a which inserts storage media into the storage rack or the recording/reproducing device and which detaches the storage media from the storage rack or the recording/reproducing device, a driving unit 1b which supplies driving force to the attachment/detachment unit 1a, and a coupling unit 1c which transmits driving force to the attachment/detachment unit 1a, the driving force supplied from the coupling unit 1c being different from the driving force supplied from the driving unit 1b.

The second movement device 2 includes a coupling unit 2a which is to be coupled with the coupling unit 1c of the first movement device 1 so as to transmit driving force to the coupling unit 1c and includes a driving unit 2b which supplies driving force to the coupling unit 2a.

The coupling unit 1c and the coupling unit 2a are rotatable, for example, and the coupling unit 1c rotates in combination with the coupling unit 2a when being connected to the coupling unit 2a. Then the attachment/detachment unit 1a converts the rotation operation of the coupling unit 1c into a linear operation and performs an operation of extracting a storage medium from the storage rack or the recording/reproducing device or inserting a storage medium into the storage rack or the recording/reproducing device.

Next, an operation of recovery from a failure of conveying of a storage medium will be described.

Here, it is assumed that the first movement device 1 stops in a state in which a storage medium is located between the first movement device 1 and the storage rack. In this case, a storage medium is not allowed to be extracted from the storage rack and not allowed to be stored in the storage rack in and around a position where the first movement device 1 is stopped, and therefore, operation of the library apparatus is stopped. Note that examples of such a case include a case where the first movement device 1 fails to supply a storage medium to the storage rack and fails to receive a storage medium from the storage rack and a case where a driving mechanism of the first movement device 1 fails. Furthermore, the examples include a case where the driving mechanism of the first movement device 1 fails since a supply of a storage medium to the storage rack or a reception of a storage medium from the storage rack fails.

When the first movement device 1 stops in a state in which a storage medium is located between the first movement device 1 and the storage rack as described above, a next operation is started.

First, the second movement device 2 moves to a position where the second movement device 2 abuts on the first movement device 1 so that the coupling unit 1c and the coupling unit 2a are coupled with each other.

Subsequently, the driving unit 2b supplies driving force to the coupling unit 2a. The driving force is transmitted through the coupling units 2a and is to the attachment/detachment unit 1a to drive the attachment/detachment unit 1a so that a storage medium is extracted from the storage rack or the recording/reproducing device or is inserted into the storage rack or the recording/reproducing device.

Accordingly, the storage medium does not disturb a movement of the first movement device 1, and therefore, it is not highly likely that the storage medium is broken due to the movement of the first movement device 1. Accordingly, the second movement device 2 may move the first movement device 1 to the escape area, for example. Here, when the second movement device 2 has a function of conveying a storage medium which is similar to the function of the first movement device 1, conveying of the storage medium may be continued by the second movement device 2.

Alternatively, when the first movement device 1 is recovered from the stop state and enters a movable state (for example, when the driving mechanism of the first movement device 1 has not failed) after the storage medium is extracted from the storage rack or the recording/reproducing device or after the storage medium is inserted into the storage rack or the recording/reproducing device, the conveying of the storage medium may be continued by the first movement device 1. In this way, the failure of the conveying of the storage medium is recovered.

As described above, in the library apparatus according to the first embodiment, even when the first movement device 1 stops in a state in which a storage medium is located between the first movement device 1 and the storage rack, for example, the following operation may be performed. Specifically, when the coupling unit 1c and the coupling unit 2a are coupled with each other, the attachment/detachment unit 1a may be driven by driving force supplied from the driving unit 2b, and accordingly, a storage medium may be extracted from the storage rack or the recording/reproducing device or may be inserted into the storage rack or the recording/reproducing device.

Accordingly, the first movement device 1 may be moved to the escape area or the first movement device 1 may be recovered from the stop state and enters the movable state, and the storage medium may be recovered from the conveying failure.

Second Embodiment

Figure 2:
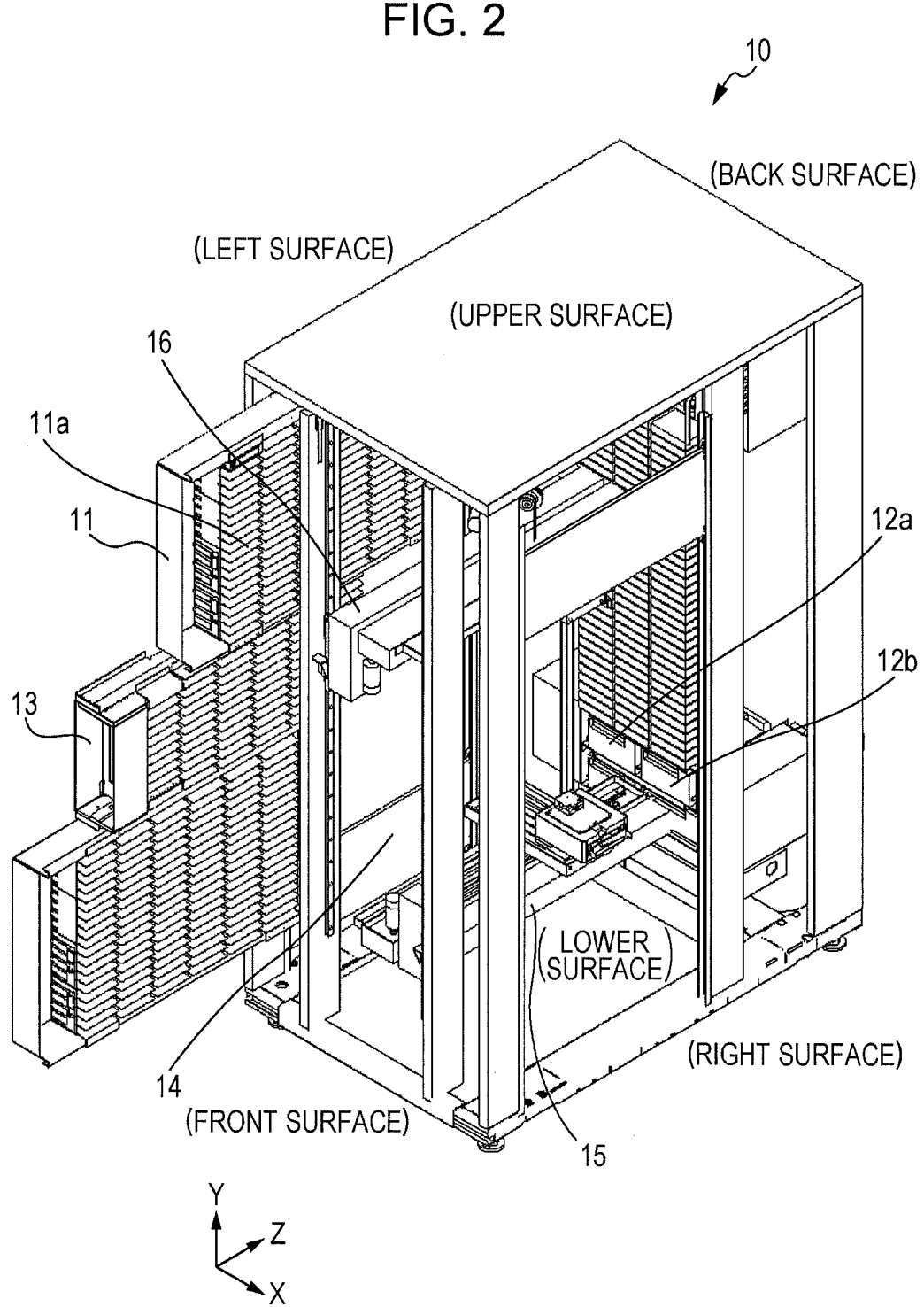
FIG. 2 is a diagram illustrating an appearance of a library apparatus according to a second embodiment.

FIG. 2 is a diagram illustrating an appearance of a library apparatus according to a second embodiment.

A library apparatus 10 includes a storage rack 11 which stores a plurality of storage media such as magnetic tapes and optical discs and drives 12a and 12b which write data into the storage media and read data from the storage media. The library apparatus 10 further includes a cartridge access station (CAS) 13 which inserts a storage medium into the library apparatus 10 and which ejects a storage medium from the library apparatus 10.

The storage rack 11 has hundreds of slots 11a, for example, and the slots 11a accommodate respective storage media accommodated in respective cartridges. Hereinafter, the term "storage medium" represents a storage medium which is accommodated in a cartridge. The storage rack 11 is disposed in a left surface, a right surface, and a back surface of the library apparatus 10. Note that, in FIG. 2, the storage rack 11 located in the right surface of the library apparatus 10 is omitted for convenience of description.

Furthermore, the library apparatus 10 includes a conveying gap 14 through which storage media are conveyed, a lower conveying robot 15 and an upper conveying robot 16 which move through the conveying gap 14 so as to convey the storage media. The lower conveying robot 15 and the upper conveying robot 16 convey the storage media among the cartridge access station 13, the slots 11a, and the drives 12a and 12b.

Note that a direction from the left surface to the right surface of the library apparatus 10 is determined to be an X direction, a direction from a lower surface to an upper surface of the library apparatus 10 is determined to be a Y direction, and a direction from a front surface to the back surface of the library apparatus 10 is determined to be a Z direction.

Figure 3:
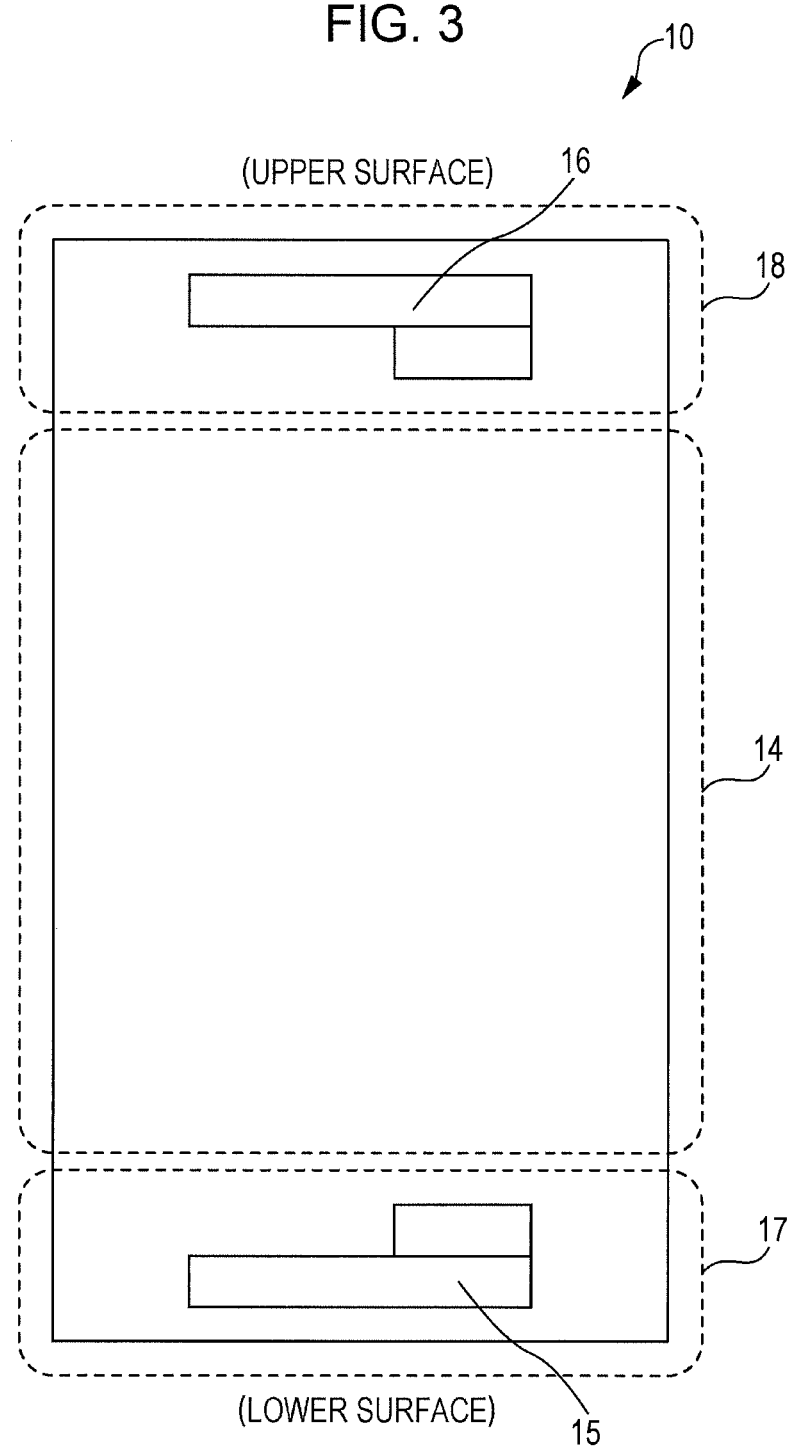
FIG. 3 is a diagram illustrating escape areas according to the second embodiment.

FIG. 3 is a diagram illustrating escape areas according to the second embodiment.

The library apparatus 10 has an escape area 17 which accommodates the lower conveying robot 15 which has escaped on a lower surface side relative to the conveying gap 14 and an escape area 18 which accommodates the upper conveying robot 16 which has escaped on an upper surface side relative to the conveying gap 14. When only the upper conveying robot 16 is used, the lower conveying robot 15 escapes and is accommodated in the escape area 17. On the other hand, when only the lower conveying robot 15 is used, the upper conveying robot 16 escapes and is accommodated in the escape area 18.

Figure 4:
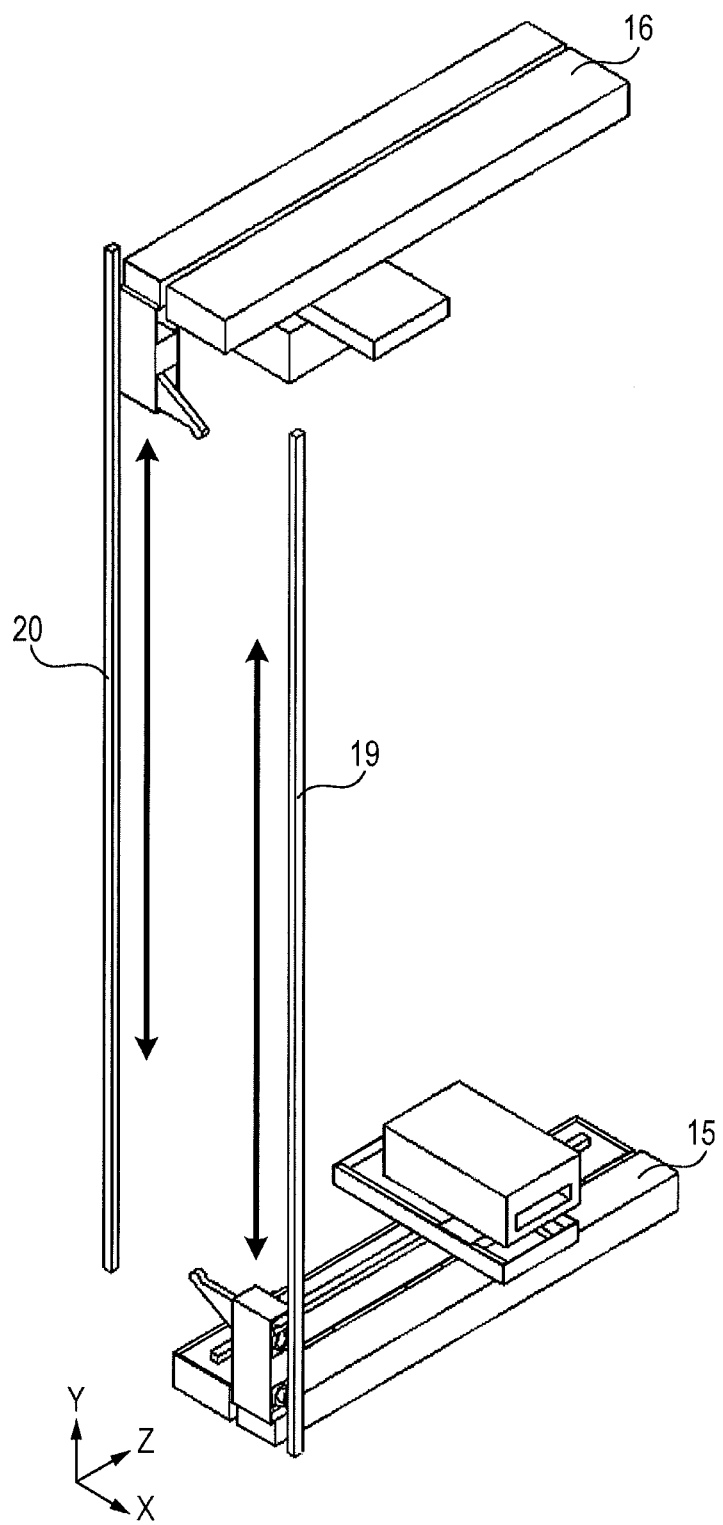
FIG. 4 is a diagram illustrating a movement mechanism of conveying robots according to the second embodiment.

FIG. 4 is a diagram illustrating a movement mechanism of conveying robots according to the second embodiment.

The library apparatus 10 has rails 19 and 20 on the front surface side thereof which extend in the Y direction. The lower conveying robot 15 is slidably attached to the rail 19 and moves in the Y direction (±Y direction) along the rail 19. The upper conveying robot 16 is slidably attached to the rail 20 and moves in the Y direction (±Y direction) along the rail 20.

Here, when the lower conveying robot 15 moves upward and the upper conveying robot 16 moves downward, a portion of the lower conveying robot 15 abuts on a portion of the upper conveying robot 16. Therefore, a position of the lower conveying robot 15 and a position of the upper conveying robot 16 in a vertical direction (Y direction) are not replaceable by each other.

Figure 5:
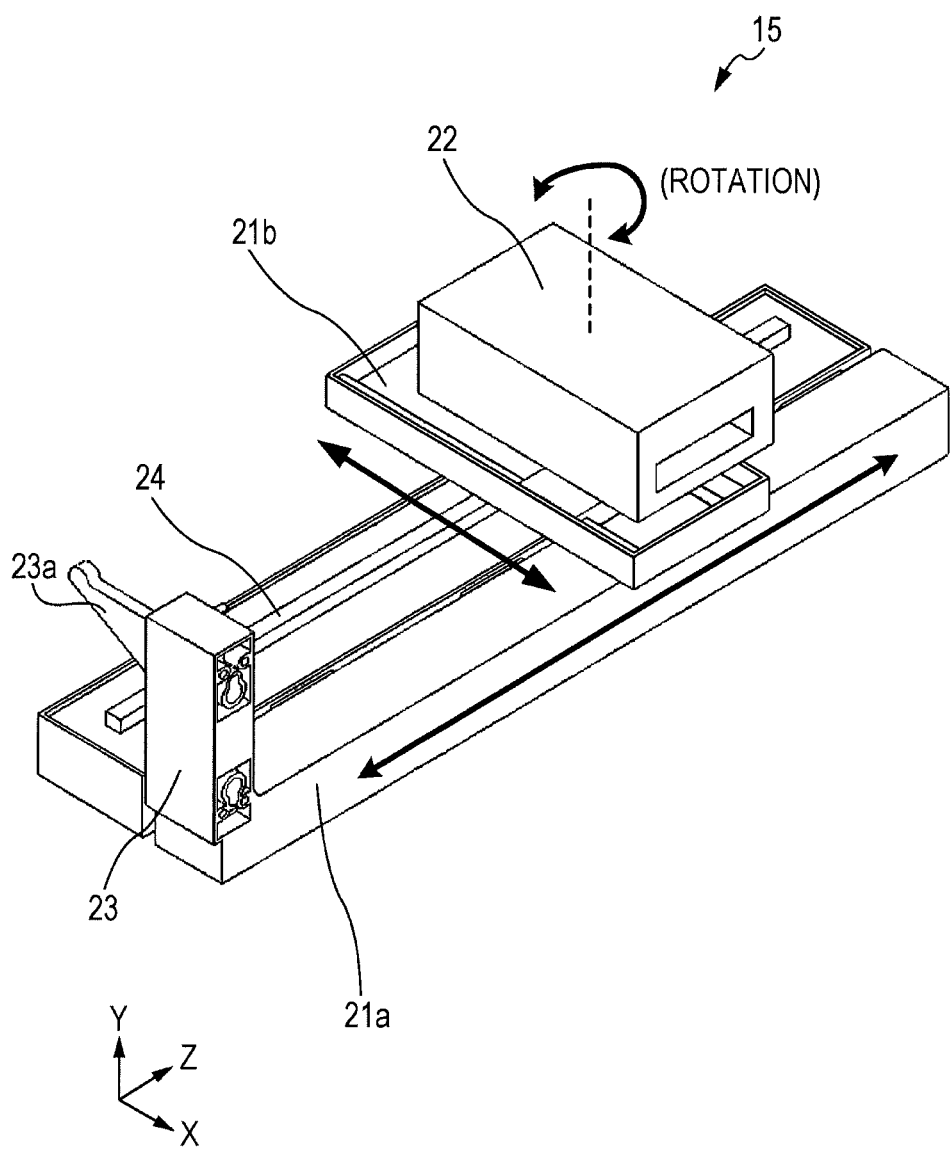
FIG. 5 is a diagram illustrating one of the conveying robots according to the second embodiment.

FIG. 5 is a diagram illustrating the conveying robots according to the second embodiment.

The lower conveying robot 15 has a support plate 21a which is attached to the rail 19 and which moves in the Y direction along the rail 19, a stage 21b which is disposed on the support plate 21a, a hand unit 22 which is mounted on the stage 21b, and a stopper unit 23 which is disposed on the support plate 21a.

The hand unit 22 receives storage media from the slots 11a, the drives 12a and 12b, and the cartridge access station 13 and passes storage media to the slots 11a, the drives 12a and 12b, and the cartridge access station 13. The stopper unit 23 has a stopper 23a and a lock mechanism to lock the stopper 23a. The stopper 23a abuts on the upper conveying robot 16 so that the lower conveying robot 15 and the upper conveying robot 16 have a certain gap therebetween.

The support plate 21a has a rail 24 which extends in the Z direction. The stage 21b is slidably attached to the rail 24 and moves in the Z direction (±Z direction) along the rail 24. The hand unit 22 is movable in the X direction (±X direction) relative to the stage 21b and is rotatably attached to the stage 21b.

With this mechanism, the hand unit 22 may be moved in the X, Y, and Z directions and may be rotated.

Similarly, the upper conveying robot 16 also has a support plate, a stage, a hand unit, and a stopper unit which have the same functions as those of the lower conveying robot 15. Note that, in the upper conveying robot 16, the stage, the hand unit, and the stopper unit are mounted on a lower side of the support plate. That is, the stage 21b, the hand unit 22, and the stopper unit 23 of the lower conveying robot 15 are located so as to face the stage, the hand unit, and the stopper unit of the upper conveying robot 16.

Figure 6:
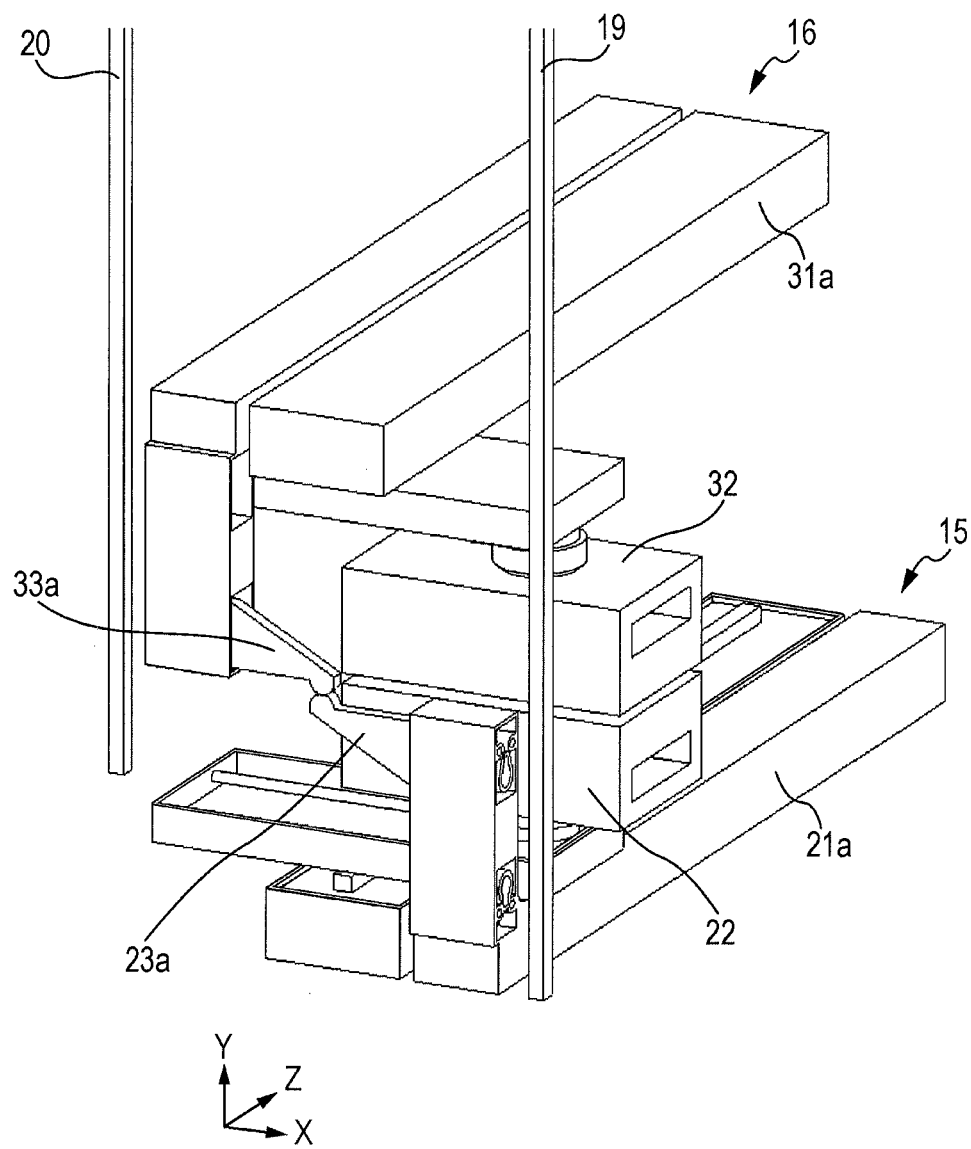
FIG. 6 is a diagram illustrating a state of the conveying robots according to the second embodiment.
Figure 7:
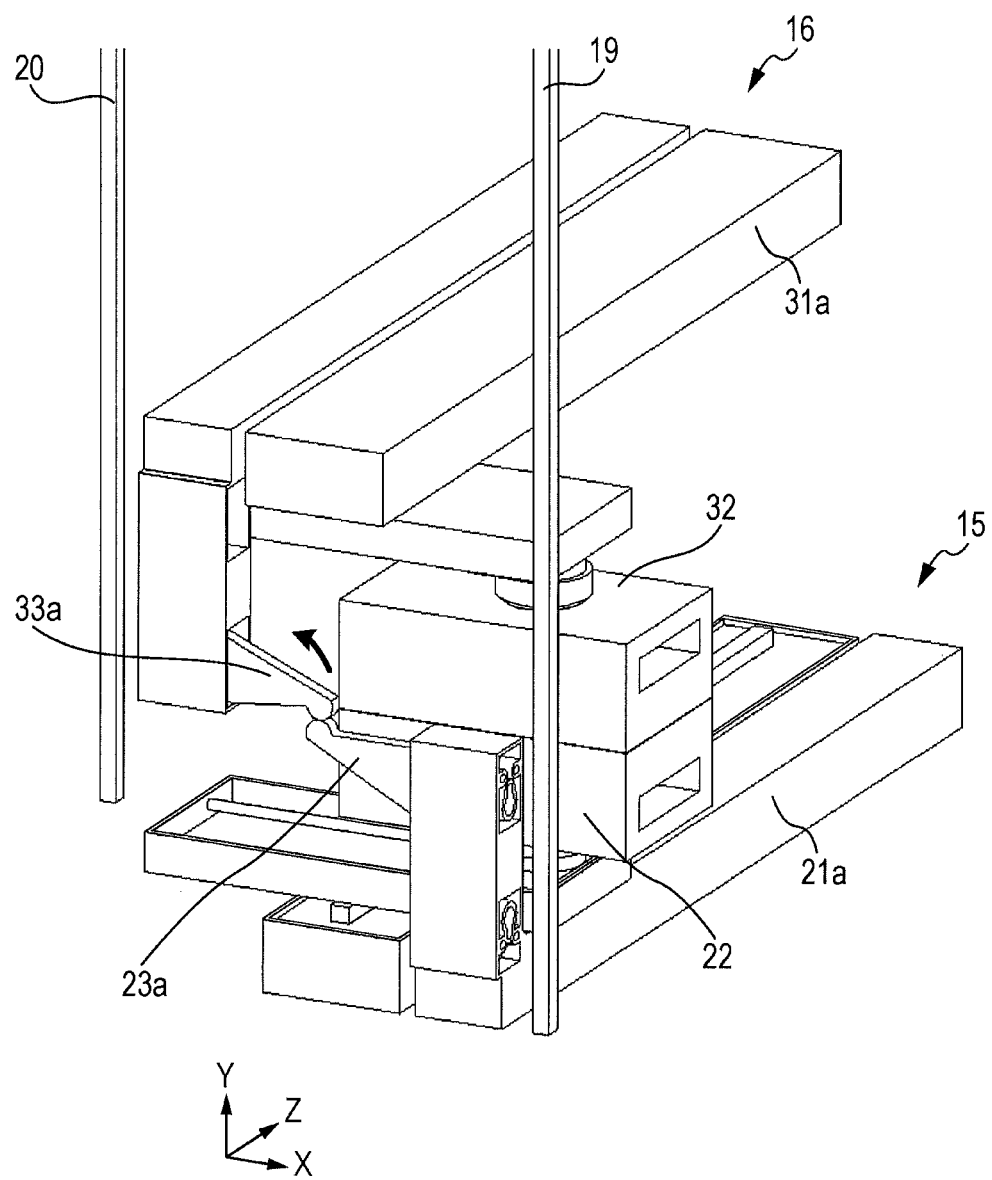
FIG. 7 is a diagram illustrating another state of the conveying robots according to the second embodiment.

FIGS. 6 and 7 are diagrams illustrating states of the conveying robots according to the second embodiment.

FIG. 6 illustrates a state in which the lower conveying robot 15 and the upper conveying robot 16 abut on each other while the stopper 23a of the lower conveying robot 15 and a stopper 33a of the upper conveying robot 16 are locked. In this state, one of the lower conveying robot 15 and the upper conveying robot 16 may be moved to the corresponding one of the escape areas 17 and 18 by being pushed in the Y direction by the other one of the conveying robots 15 and 16.

In this case, the distance between the lower conveying robot 15 and the upper conveying robot 16 is maintained while the stopper 23a abuts on the stopper 33a. Specifically, the lower conveying robot 15 and the upper conveying robot 16 do not abut on each other in portions other than the stoppers 23a and 33a. Therefore, when one of the lower conveying robot 15 and the upper conveying robot 16 is moved by the other one of the lower conveying robot 15 and the upper conveying robot 16 to the corresponding one of the escape areas 17 and 18, possibility for breakdown of the lower conveying robot 15 and the upper conveying robot 16 may be reduced.

Note that, even when the lower conveying robot 15 and the upper conveying robot 16 are simultaneously operated to convey a storage medium, the possibility for the breakdown of the lower conveying robot 15 and the upper conveying robot 16 may be reduced by locking the stoppers 23a and 33a.

FIG. 7 illustrates a state in which the lower conveying robot 15 and the upper conveying robot 16 abut on each other while the stopper 23a of the lower conveying robot 15 or the stopper 33a of the upper conveying robot 16 is unlocked.

In this case, when the stopper 23a abuts on the stopper 33a, one of the stoppers 23a and 33a which is unlocked rotates, for example, and moves in a direction opposite to the other one of the stoppers 23a and 33a. By this, the lower conveying robot 15 and the upper conveying robot 16 may move closer to each other.

Figure 8:
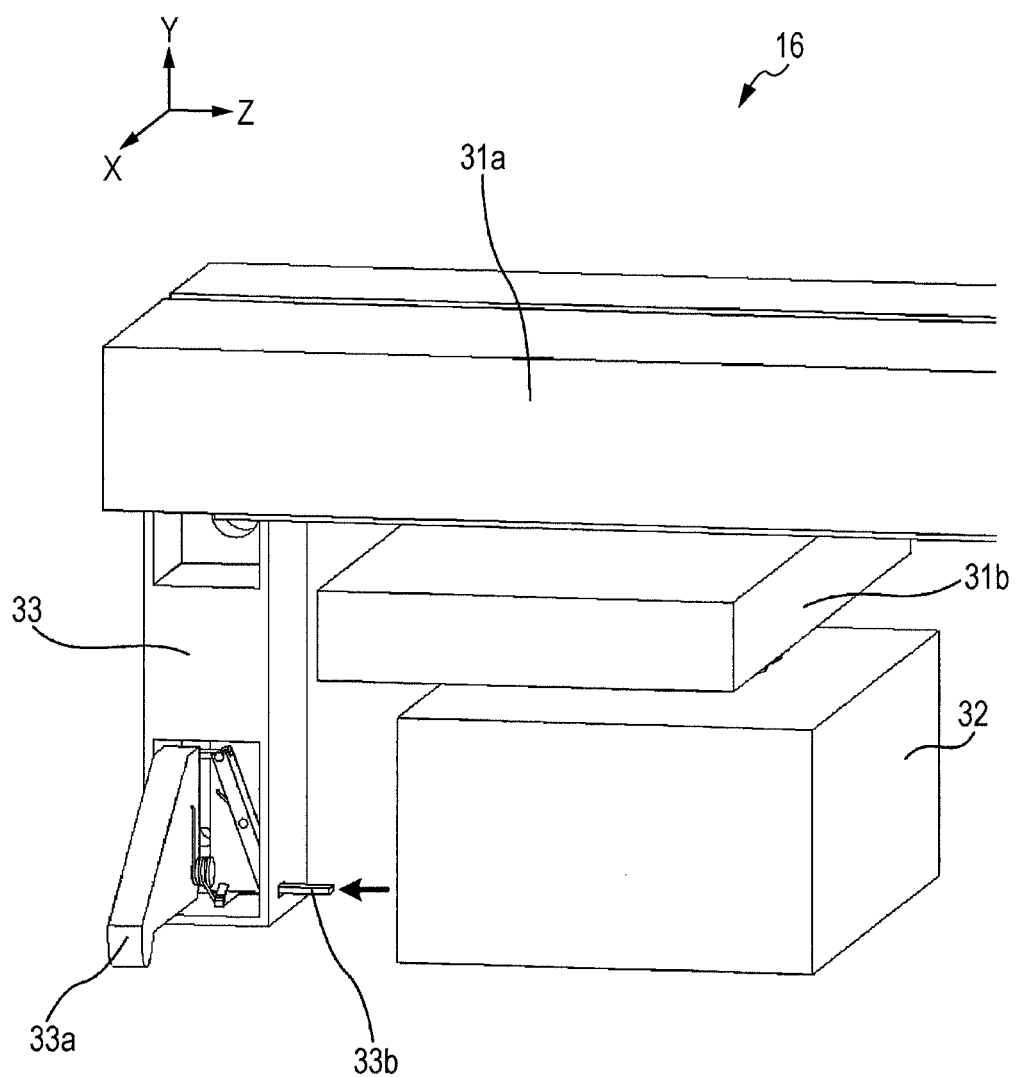
FIG. 8 is a diagram illustrating a stopper unit of one of the conveying robots according to the second embodiment.
Figure 9:
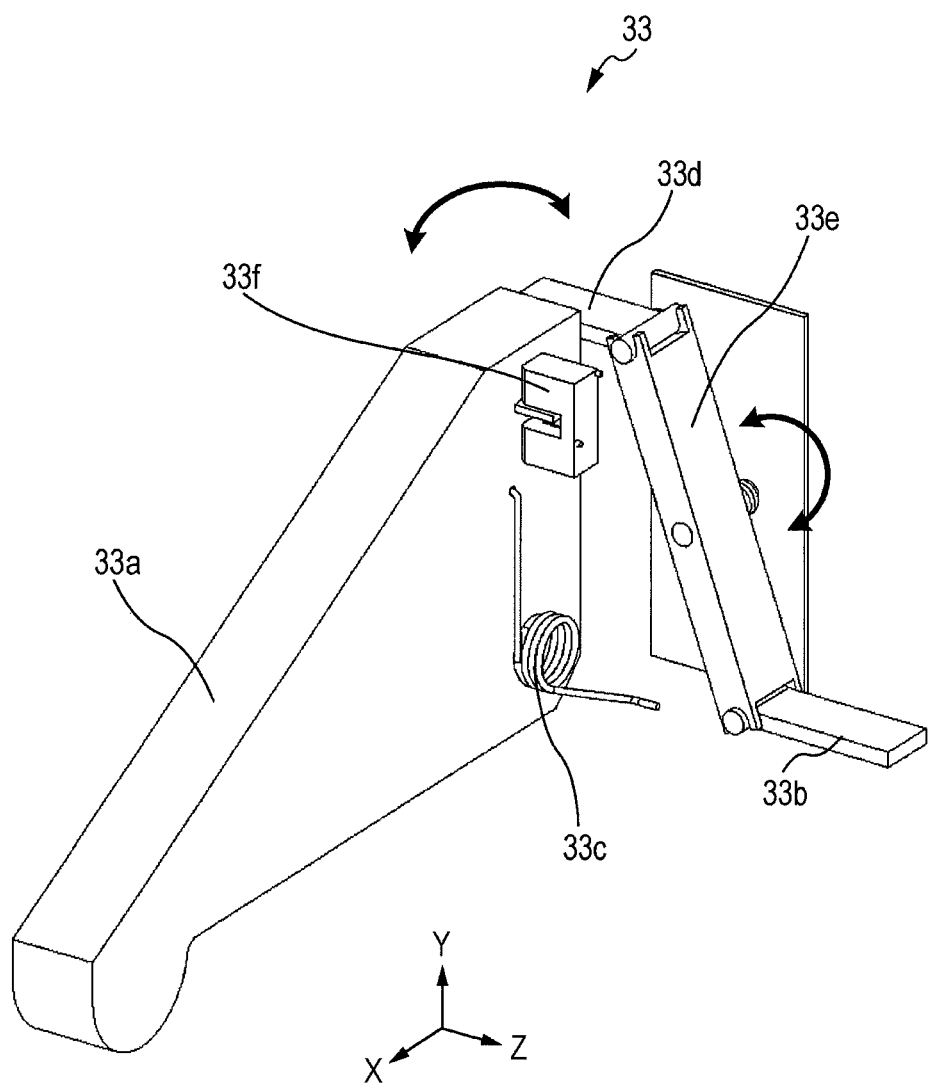
FIG. 9 is a diagram illustrating the stopper unit of the conveying robot according to the second embodiment.
Figure 10:
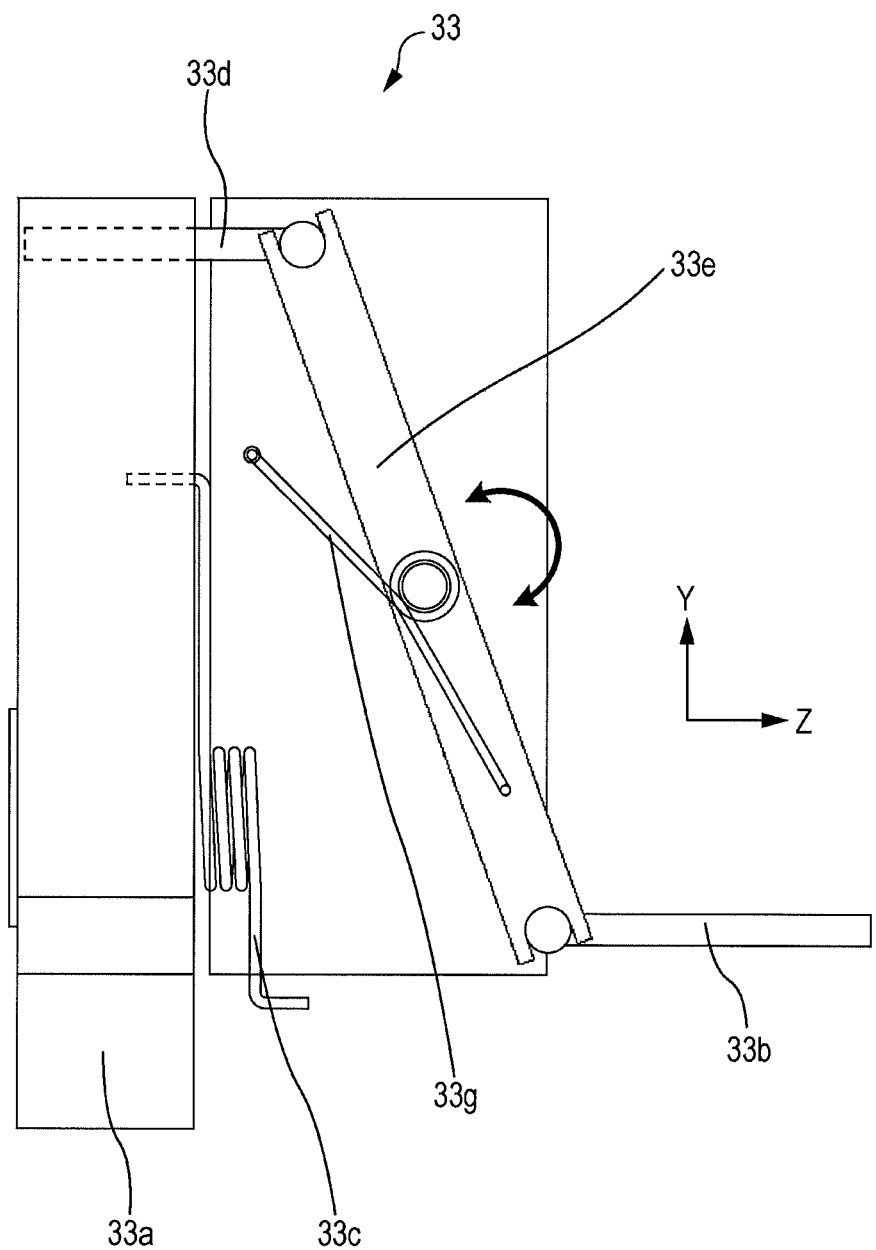
FIG. 10 is a diagram illustrating the stopper unit of the conveying robot according to the second embodiment.
Figure 11:
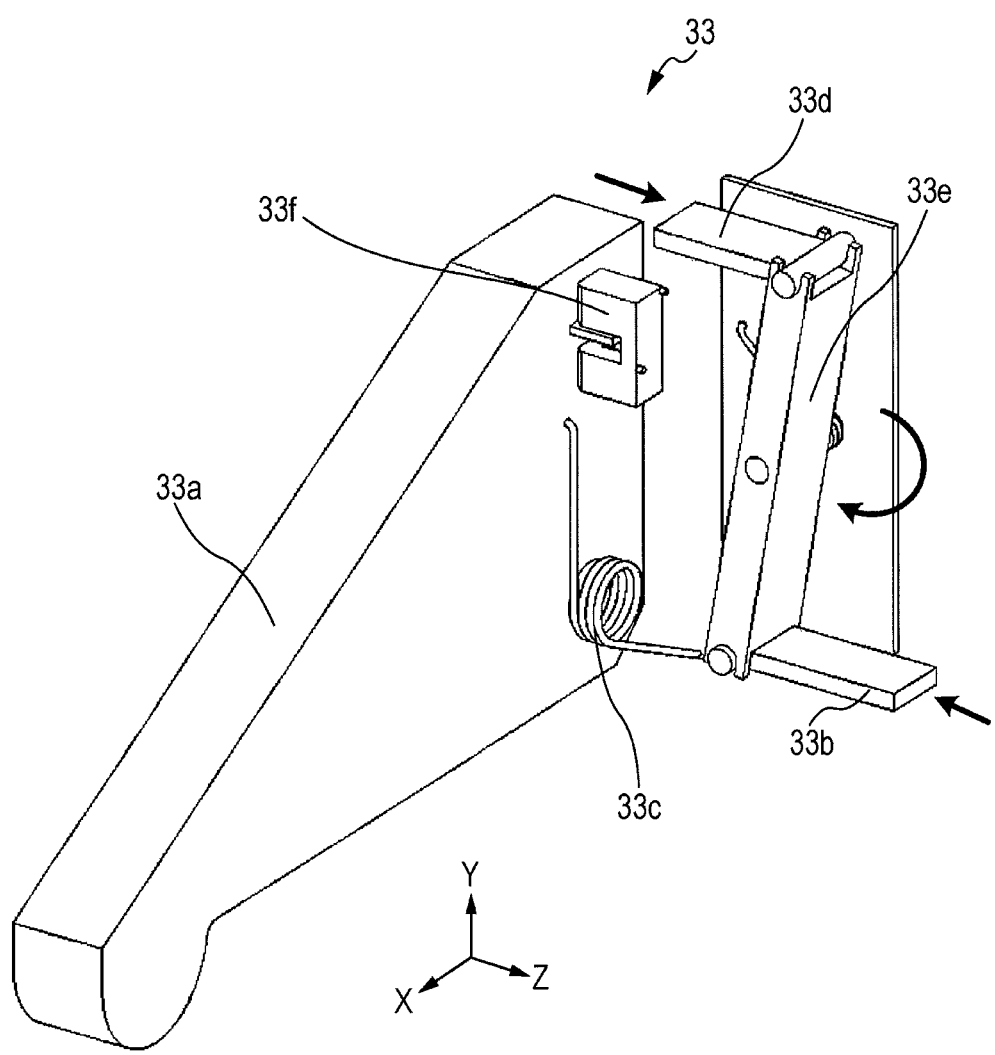
FIG. 11 is a diagram illustrating the stopper unit of the conveying robot according to the second embodiment.
Figure 12:
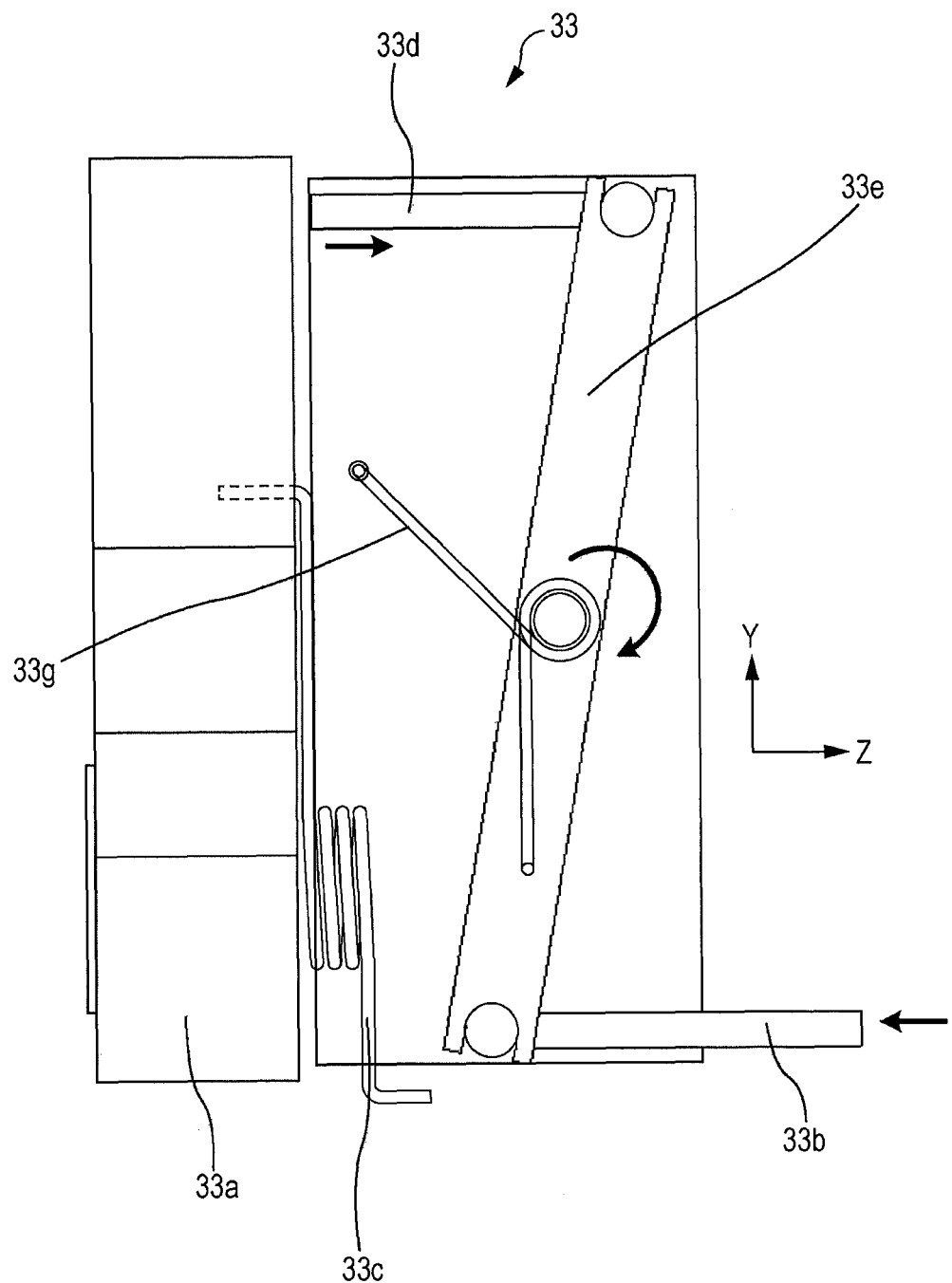
FIG. 12 is a diagram illustrating the stopper unit of the conveying robot according to the second embodiment.
Figure 13:
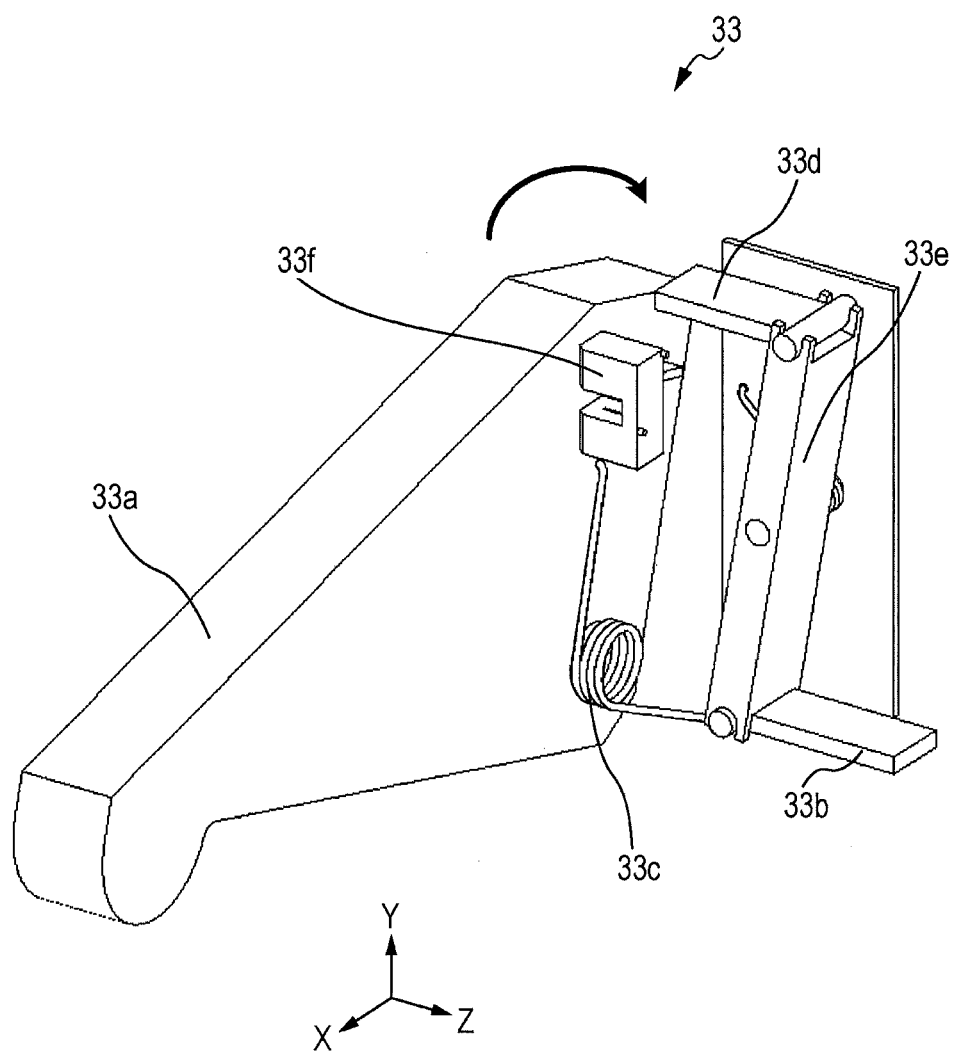
FIG. 13 is a diagram illustrating the stopper unit of the conveying robot according to the second embodiment.

FIGS. 8 to 13 are diagrams illustrating one of the stopper units of the conveying robots according to the second embodiment. FIG. 8 is a diagram illustrating an appearance of a stopper unit 33 of the upper conveying robot 16, FIGS. 9, 11, and 13 are perspective views illustrating an internal configuration of the stopper unit 33, and FIGS. 10 and 12 are plan views illustrating the internal configuration of the stopper unit 33 viewed in the X direction.

As illustrated in FIG. 8, the stopper unit 33 of the upper conveying robot 16 includes the stopper 33a which projects from a housing of the stopper unit 33 and an unlocking bar 33b which projects from the housing in the +Z direction. Here, a hand unit 32 pushes the unlocking bar 33b into the housing when moving to an end in the −Z direction of a support plate 31a (toward the front side of the library apparatus 10).

As illustrated in FIGS. 9 and 10, the stopper 33a is rotatably attached while setting the Z direction as an axis. Furthermore, a torsion spring 33c is attached to the stopper 33a. By this, the stopper 33a receives a pressure in a left rotation direction (counterclockwise direction) relative to the −Z direction.

Furthermore, the stopper unit 33 has a rotation bar 33e including the unlocking bar 33b at one end thereof and a lock bar 33d at the other end thereof. The rotation bar 33e is rotatably attached to the stopper unit 33 while setting the X direction as an axis. A torsion spring 33g is attached to the rotation bar 33e. By this, the rotation bar 33e receives a pressure in the counterclockwise direction relative to the −X direction.

While the unlocking bar 33b does not receive a pressure in the −Z direction applied by the hand unit 32, the lock bar 33d is located on a rotational trajectory of the stopper 33a so as to suppress right rotation (clockwise rotation) of the stopper 33a relative to the −Z direction. Specifically, the stopper 33a is locked by the lock bar 33d (a lock state).

Furthermore, the stopper 33a has a sensor 33f attached thereto which detects a rotation position of the stopper 33a.

When the unlocking bar 33b is pushed by the hand unit 32, the rotation bar 33e rotates in the clockwise direction relative to the −X direction as illustrated in FIGS. 11 and 12. With this rotation, the lock bar 33d moves out of the rotational trajectory of the stopper 33a, and therefore, the stopper 33a may freely rotate in the right rotation direction (clockwise direction) relative to the −Z direction (an unlocked state).

In the unlocked state, when the upper conveying robot 16 moves close to the lower conveying robot 15 and the stopper 23a of the lower conveying robot 15 abuts on the stopper 33a as illustrated in FIG. 7, the stopper 33a rotates in the clockwise direction relative to the −Z direction as illustrated in FIG. 13. In this case, a rotation of the lock bar 33d in the counterclockwise direction relative to the −X direction is blocked by the rotated stopper 33a. Therefore, even when the hand unit 32 moves in the +Z direction and therefore the pressure of the unlocking bar 33b is cancelled, the unlocked state is maintained.

As described above, since the stopper 33a is unlocked when the hand unit 32 moves to the end of the support plate 31a in the −Z direction, the stopper 33a may be unlocked irrespective of positions of the hand units 22 and 32 relative to the Y direction.

Note that the stopper unit 23 of the lower conveying robot 15 also includes an unlocking bar, a lock bar, and a rotation bar which have the same functions as those of the stopper unit 33 of the upper conveying robot 16.

Figure 14:
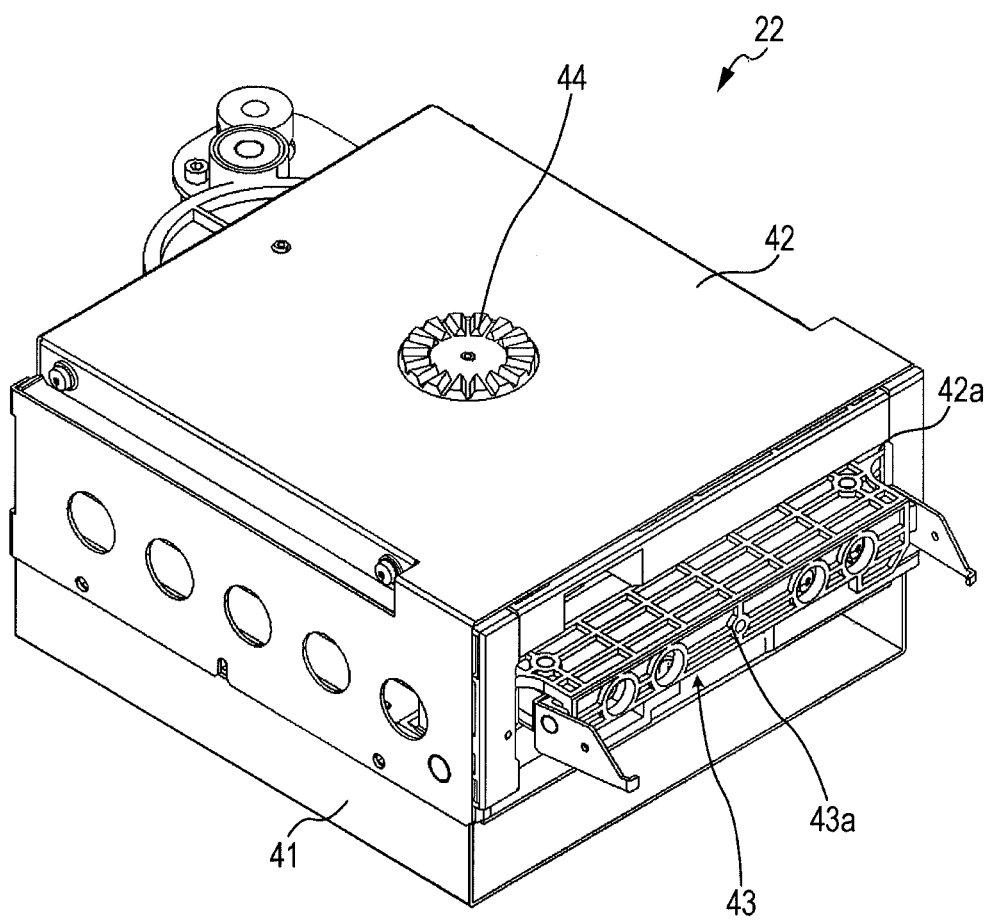
FIG. 14 is a diagram illustrating an appearance of a first hand unit according to the second embodiment.
Figure 15:
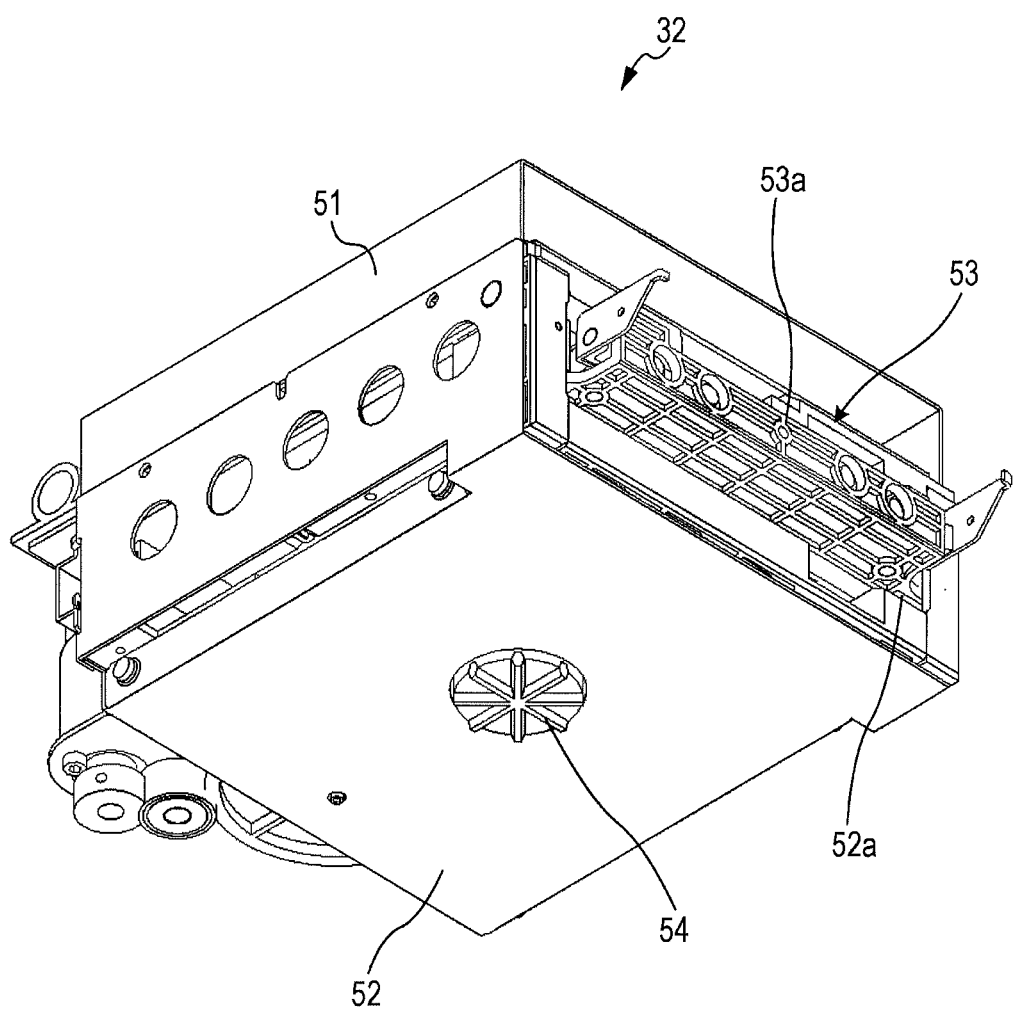
FIG. 15 is a diagram illustrating an appearance of a second hand unit according to the second embodiment.

FIGS. 14 and 15 are diagrams illustrating appearances of the hand units according to the second embodiment.

As illustrated in FIG. 14, the hand unit 22 of the lower conveying robot 15 includes a base 41 and a cover 42 which covers the base 41. The cover 42 has an opening 42a on one side thereof. A space surrounded by the base 41 and the cover 42 functions as an accommodation unit which accommodates a storage medium.

Furthermore, the hand unit 22 includes a hand 43 which is used when the storage medium is stored in the accommodation unit and when the storage medium is ejected from the accommodation unit. The hand 43 includes a pinch unit 43a which pinches a storage medium. When the pinch unit 43a moves in a horizontal direction (a direction along an X-Z plane) in the accommodation unit, a storage medium is accommodated or extracted through the opening 42a.

The hand unit 22 includes a meshing unit 44 which may rotate while a vertical direction (Y direction) is set as an axis. The meshing unit 44 is exposed from an upper surface of the cover 42 and projects upward of the cover 42.

As illustrated in FIG. 15, the hand unit 32 of the upper conveying robot 16 includes a base 51, a cover 52 having an opening 52a, a hand 53 having a pinch unit 53a, and a meshing unit 54 which have the same functions as those of the hand unit 22 of the lower conveying robot 15.

Note that the hand unit 32 is attached to the support plate 31a in an upside-down manner. Specifically, the meshing unit 44 of the lower conveying robot 15 faces the meshing unit 54 of the upper conveying robot 16 along the Y direction. The meshing unit 44 meshes with the meshing unit 54. When the meshing unit 54 rotates in a state in which the meshing unit 44 meshes with the meshing unit 54, the meshing unit 44 rotates with the rotation of the meshing unit 54.

Figure 16:
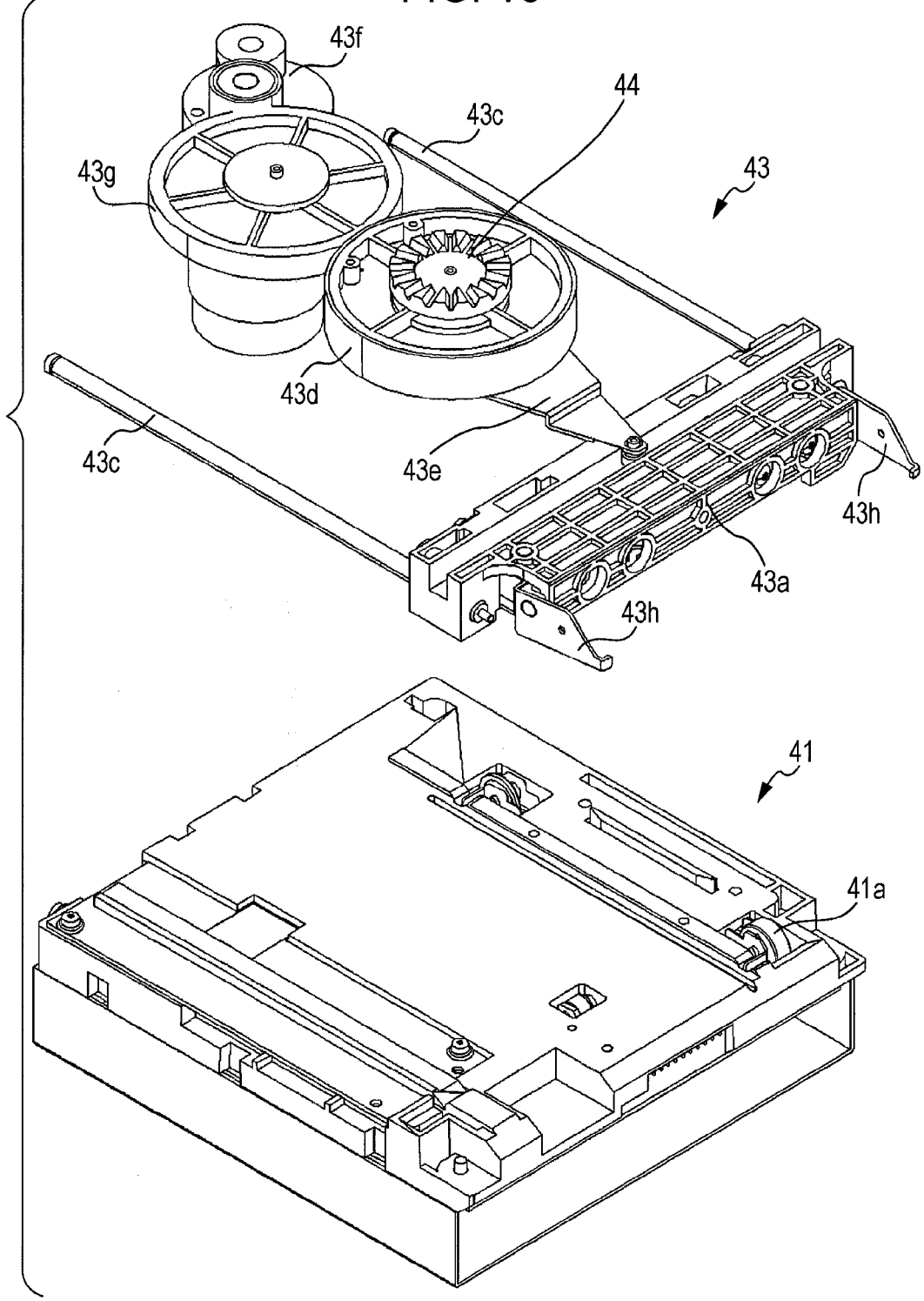
FIG. 16 is an exploded view of the first hand unit according to the second embodiment.

FIG. 16 is an exploded view of one of the hand units according to the second embodiment.

Note that, although the hand unit 22 of the lower conveying robot 15 will be described herein as an example, the hand unit 32 of the upper conveying robot 16 has the same configuration. Furthermore, in FIG. 16, the cover 42 is omitted.

The hand 43 includes the pinch unit 43a, rail bars 43c, rotation gears 43d and 43g, a rotation member 43e, and a hand motor 43f. The pinch unit 43a has pinch nails 43h. The pinch unit 43a is slidably attached to the rail bars 43c.

The rotation gear 43d and the rotation member 43e are attached to a rotation shaft of the meshing unit 44. An end of the rotation member 43e is movably attached to the pinch unit 43a. The rotation gear 43g transmits a rotation of the hand motor 43f to the rotation gear 43d. Furthermore, the base 41 has rollers 41a which feed a storage medium.

Specifically, when the meshing unit 44 is rotated by an external force, the rotation member 43e is also rotated along with the rotation of the meshing unit 44. Furthermore, when the hand motor 43f is rotated, the meshing unit 44 and the rotation member 43e are rotated along with the rotation of the hand motor 43f.

FIGS. 17 to 22 are diagrams illustrating an operation of one of the hands according to the second embodiment.

Note that, in FIGS. 17 to 22, the cover 42 is see-through and the meshing unit 44 and the rotation gears 43d and 43g are omitted.

Figure 17:
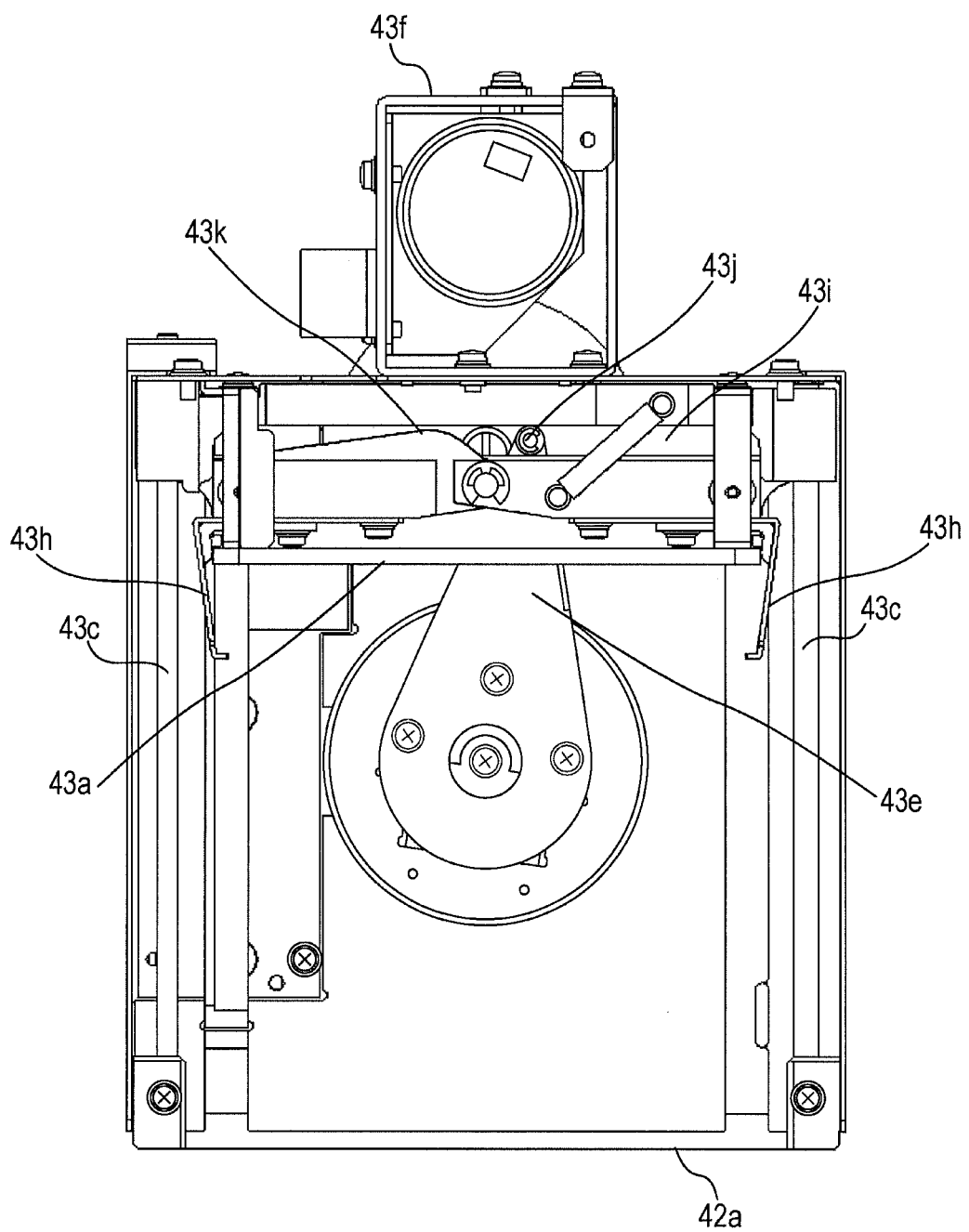
FIG. 17 is a diagram illustrating an operation of a hand viewed from an upper surface according to the second embodiment.

As illustrated in FIG. 17, the pinch unit 43a has a slit 43i which extends in a direction orthogonal to a slide direction of the pinch unit 43a. Furthermore, the rotation member 43e has a roller 43j at the end thereof.

The roller 43j is positioned in the slit 43i and pushes the pinch unit 43a along with a rotation of the rotation member 43e so as to slide the pinch unit 43a. Furthermore, the roller 43j moves along the slit 43i when the rotation member 43e moves.

The slit 43i has a projection 43k. The projection 43k is coupled with the pinch nails 43h. When the roller 43j moves along the slit 43i so as to push the projection 43k, the pinch nails 43h are opened.

FIG. 17 illustrates a waiting state or a state in which a storage medium is accommodated (the storage medium is omitted), and the pinch unit 43a is positioned in an end opposite to the opening 42a.

Figure 18:
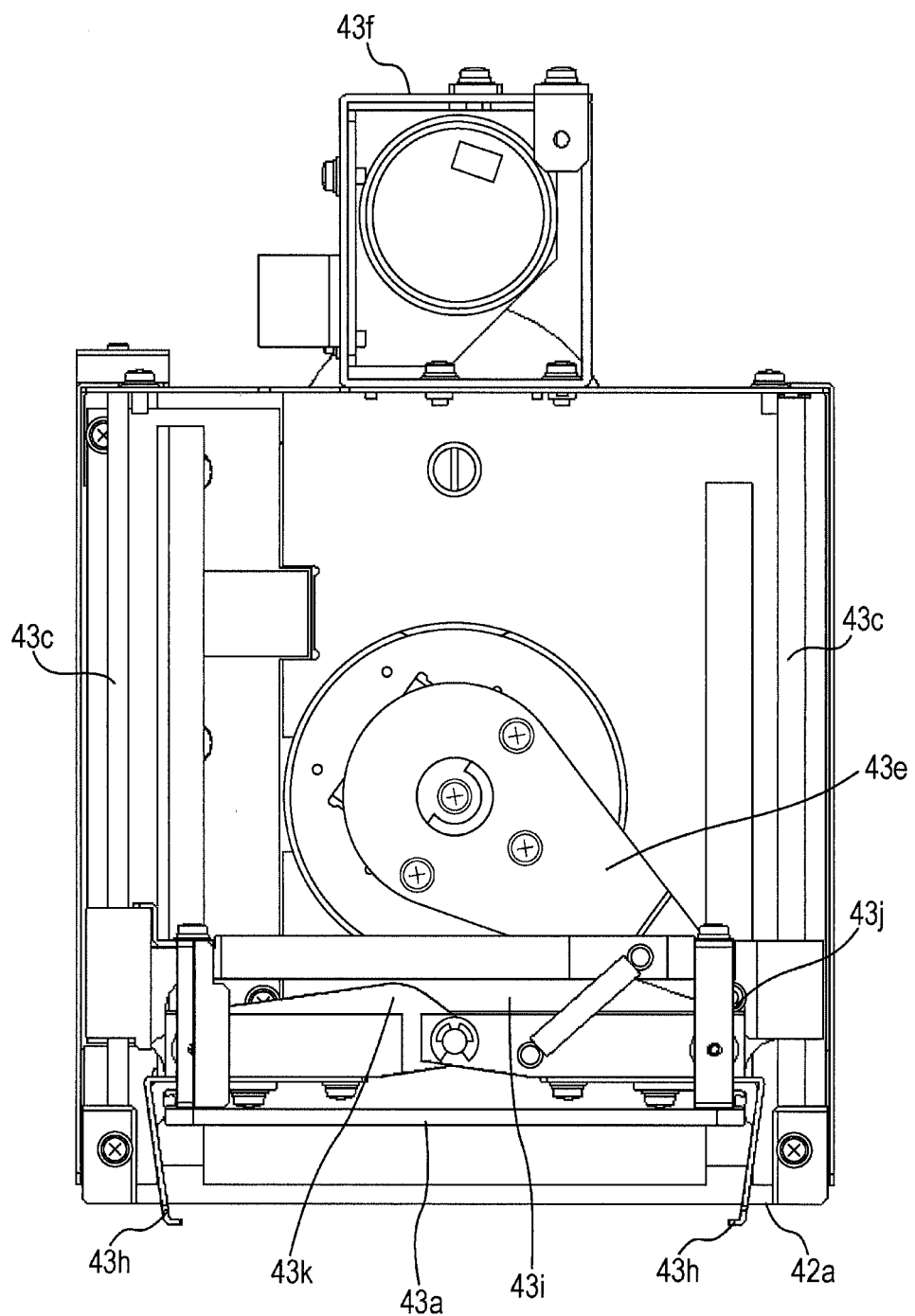
FIG. 18 is a diagram illustrating the operation of the hand viewed from the upper surface according to the second embodiment.

When the rotation member 43e rotates in the clockwise direction of FIG. 17 in this state, the pinch unit 43a is pushed by the roller 43j and slides toward the opening 42a as illustrated in FIG. 18.

Figure 19:
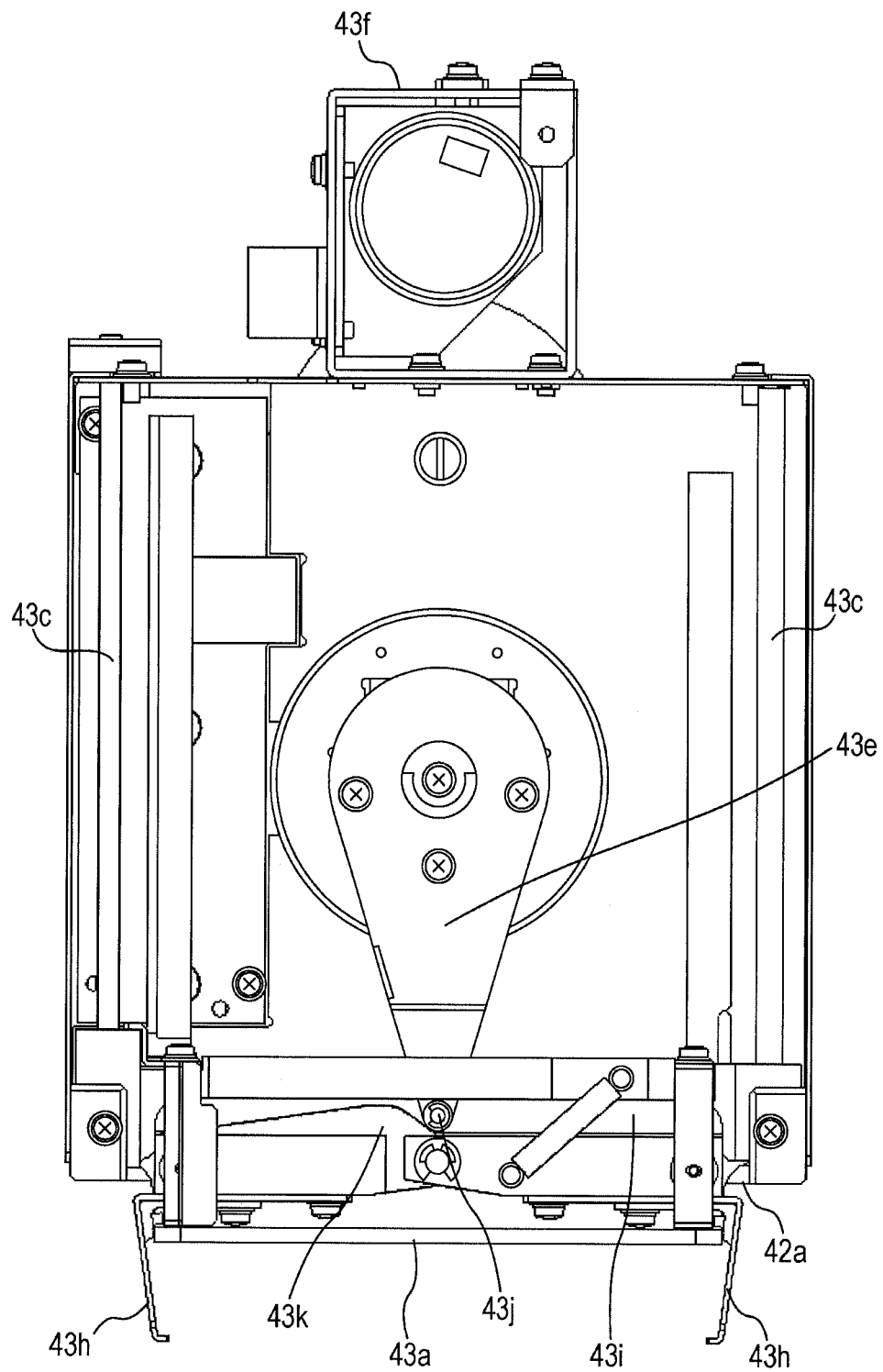
FIG. 19 is a diagram illustrating the operation of the hand viewed from the upper surface according to the second embodiment.

When the rotation member 43e further rotates, the pinch unit 43a is pushed by the roller 43j and protrudes outwards from the opening 42a as illustrated in FIG. 19.

Figure 20:
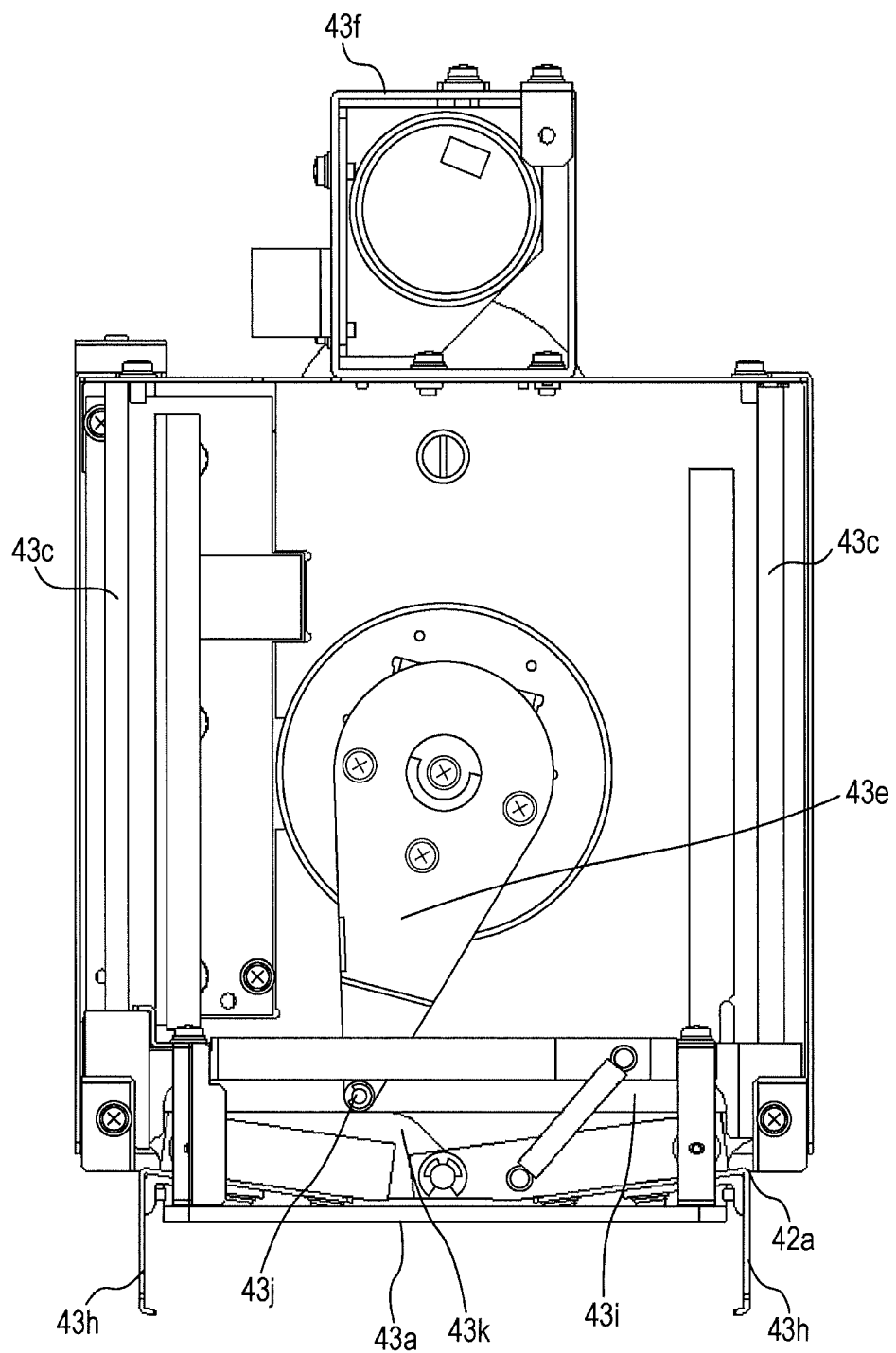
FIG. 20 is a diagram illustrating the operation of the hand viewed from the upper surface according to the second embodiment.

When the rotation member 43e further rotates, the roller 43j which moves along the slit 43i pushes the projection 43k as illustrated in FIG. 20. By this, the pinch nails 43h are opened.

Figure 21:
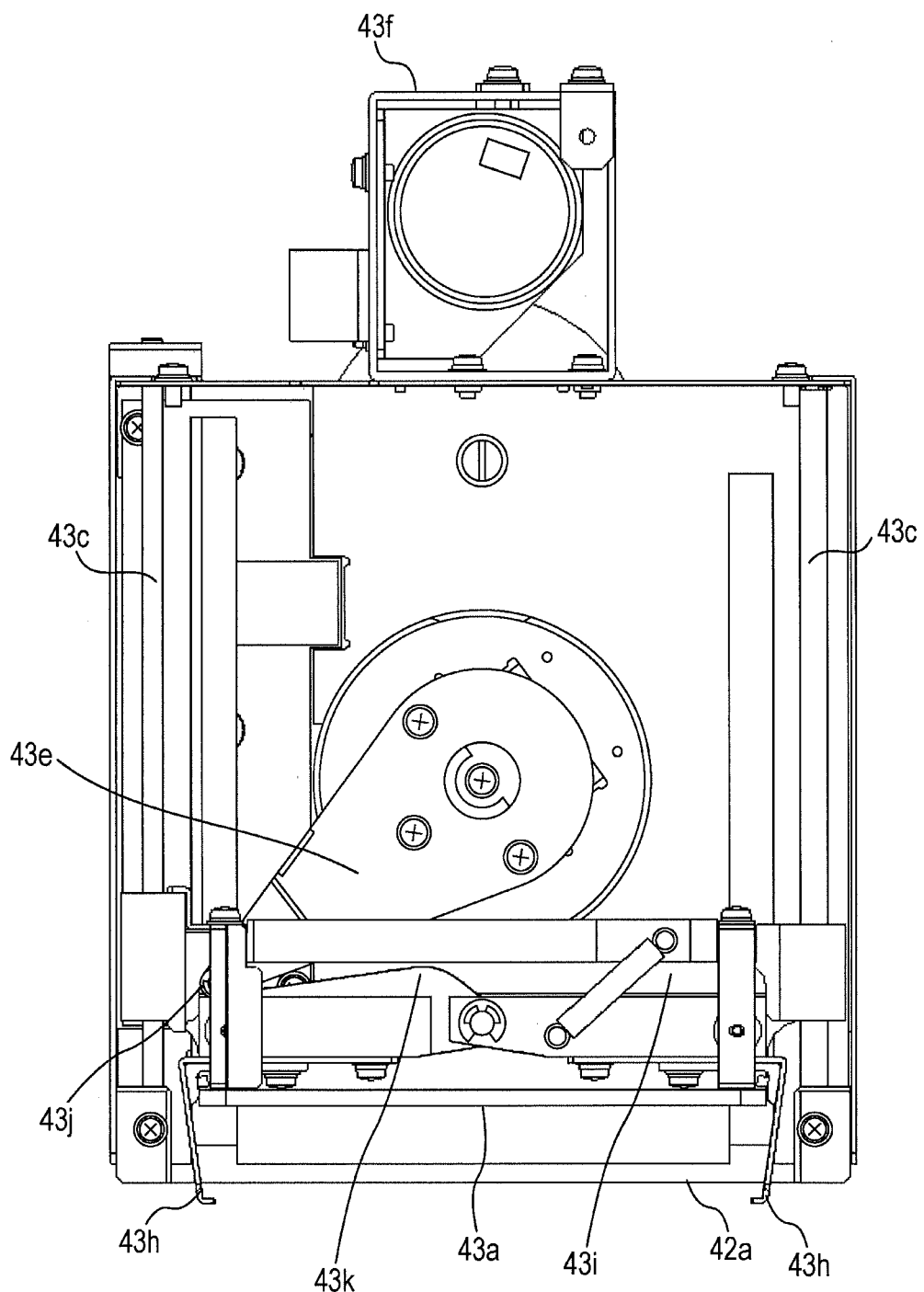
FIG. 21 is a diagram illustrating the operation of the hand viewed from the upper surface according to the second embodiment.

When the rotation member 43e further rotates, the pinch unit 43a is pushed by the roller 43j and retracts inwards from the opening 42a as illustrated in FIG. 21. In this case, since the roller 43j which moves along the slit 43i is separated from the projection 43k, the pinch nails 43h are closed.

Figure 22:
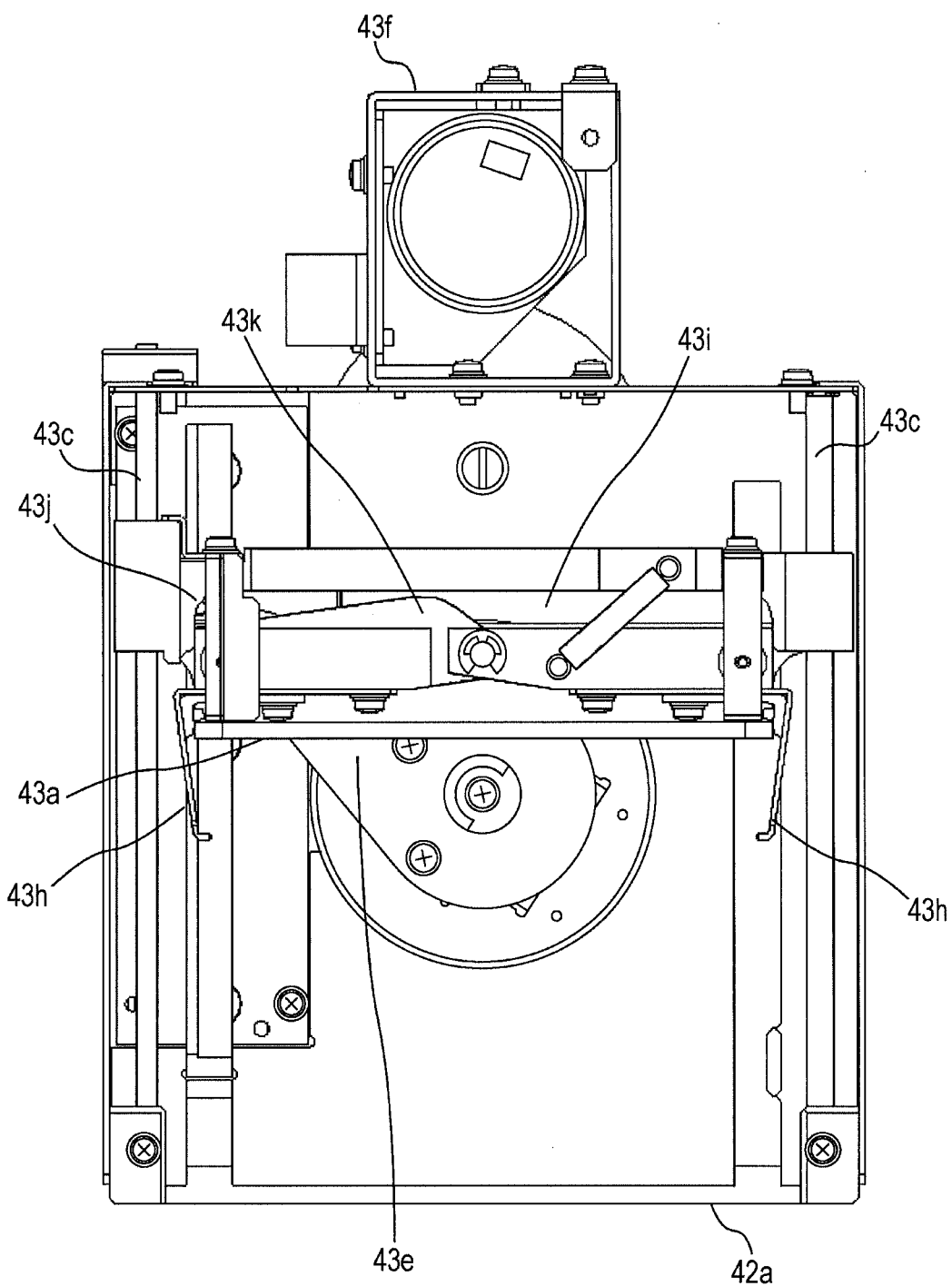
FIG. 22 is a diagram illustrating an operation of the hand viewed from the upper surface according to the second embodiment.

When the rotation member 43e further rotates, the pinch unit 43a is pushed by the roller 43j and slides in a direction in which the pinch unit 43a separates from the opening 42a as illustrated in FIG. 22.

Next, an operation of extracting a storage medium from a slot by a hand unit will be described.

FIGS. 23A to 23C and FIGS. 24A to 24C are diagrams illustrating operations of extracting a storage medium performed by one of the hand units according to the second embodiment. FIGS. 23A to 23C represent a normal state and FIGS. 24A to 24C represent an abnormal state.

Note that, here, a case where the hand unit 22 of the lower conveying robot 15 extracts a storage medium 61 from one of the slots 11a will be described as an example.

First, an operation in a normal state will be described.

First, as illustrated in FIG. 23A, the hand unit 22 moves to a certain position so that the pinch unit 43a and one of the slots 11a which accommodates the storage medium 61 face each other. Here, a center of the pinch unit 43a corresponds to a center of the slot 11a.

Next, as illustrated in FIG. 23B, the pinch nails 43h are closed. Then the pinch nails 43h are caught by grooves 61a formed on the storage medium 61.

Next, the pinch unit 43a is drawn into the accommodation unit of the hand unit 22 as illustrated in FIG. 23C. Simultaneously, the storage medium 61 is extracted from the slot 11a and stored in the accommodation unit of the hand unit 22.

Next, an operation in an abnormal state will be described.

First, as illustrated in FIG. 24A, the hand unit 22 moves to a certain position so that the pinch unit 43a and one of the slots 11a which accommodates the storage medium 61 face each other. Note that it is determined to be an abnormal state when the center of the pinch unit 43a is shifted from the center of the slot 11a.

Next, as illustrated in FIG. 24B, the pinch nails 43h are closed. In this case, although one of the pinch nails 43h is caught by a corresponding one of the grooves 61a of the storage medium 61, the other one of the pinch nails 43h is not caught by the other one of the grooves 61a.

Next, the pinch unit 43a is drawn into the accommodation unit of the hand unit 22 as illustrated in FIG. 24C. Here, since the storage medium 61 is extracted from the slots 11a by only one of the pinch nails 43h, the storage medium 61 tilts relative to an extracting direction. Therefore, the operation of the hand unit 22 may be stopped in a state in which the storage medium 61 is positioned between the hand unit 22 and the slot 11a. This state may be referred to as "GAP", for example.

Next, a controller which controls the library apparatus 10 will be described.

Figure 25:
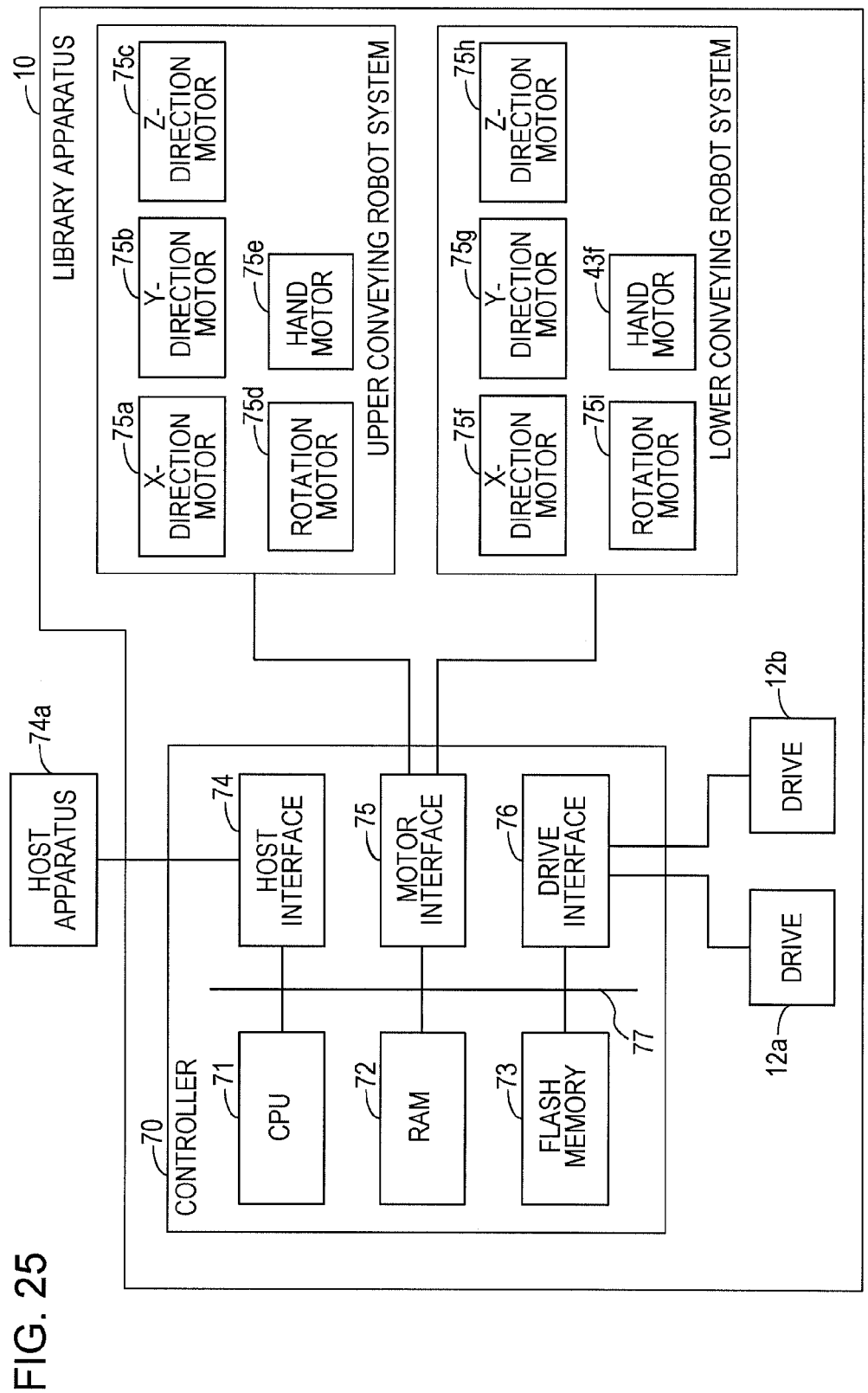
FIG. 25 is a diagram illustrating hardware of a controller according to the second embodiment.

FIG. 25 is a diagram illustrating hardware of a controller according to the second embodiment.

A controller 70 is incorporated in the library apparatus 10, for example. The controller 70 controls movements in the X, Y, and Z directions and a rotation of the hand unit 22 of the lower conveying robot 15 and an operation of the hand 43. Furthermore, the controller 70 controls movements in the X, Y, and Z directions and a rotation of the hand unit 32 of the upper conveying robot 16 and an operation of the hand 53. Moreover, the controller 70 controls a data writing operation and a data reading operation performed by the drives 12a and 12b.

The controller 70 is entirely controlled by a CPU (Central Processing Unit) 71. To the CPU 71, a RAM (Random Access Memory) 72, a flash memory 73, and a plurality of peripherals are connected through a bus 77.

The RAM 72 is used as a main storage device of the controller 70. The RAM 72 temporarily stores at least a number of OS (Operating System) programs and application programs to be executed by the CPU 71. The RAM 72 further stores various data used when the CPU 71 performs processes.

The flash memory 73 is used as an auxiliary storage device of the controller 70. The flash memory 73 stores OS programs, application programs, and various data.

Examples of the peripherals connected to the bus 77 include a host interface 74, a motor interface 75, and a drive interface 76.

To the host interface 74, a host apparatus 74a which is installed outside of the library apparatus 10 is connected. The host interface 74 transmits a signal supplied from the host apparatus 74a to the CPU 71. Furthermore, the host interface 74 transmits a signal supplied from the CPU 71 to the host apparatus 74a.

To the motor interface 75, an X-direction motor 75a which moves the hand unit 32 of the upper conveying robot 16 in the X direction, a Y-direction motor 75b which moves the hand unit 32 in the Y direction, a Z-direction motor 75c which moves the hand unit 32 in the Z direction, a rotation motor 75d which rotates the hand unit 32, and a hand motor 75e are connected.

Furthermore, to the motor interface 75, an X-direction motor 75f which moves the hand unit 22 of the lower conveying robot 15 in the X direction, a Y-direction motor 75g which moves the hand unit 22 in the Y direction, a Z-direction motor 75h which moves the hand unit 22 in the Z direction, a rotation motor 75i which rotates the hand unit 22, and the hand motor 43f are connected.

The motor interface 75 rotates the X-direction motors 75a and 75f, the Y-direction motors 75b and 75g, the Z-direction motors 75c and 75h, the rotation motors 75d and 75i, and the hand motors 75e and 43f under control of the CPU 71.

To the drive interface 76, the drives 12a and 12b are connected. The drive interface 76 causes the drives 12a and 12b to execute data writing to a storage medium and data reading from a storage medium under control of the CPU 71.

With this hardware configuration, processing functions according to the second embodiment may be realized.

Next, a procedure of recovery from a failure in conveying of a storage medium will be described.

Figure 26:
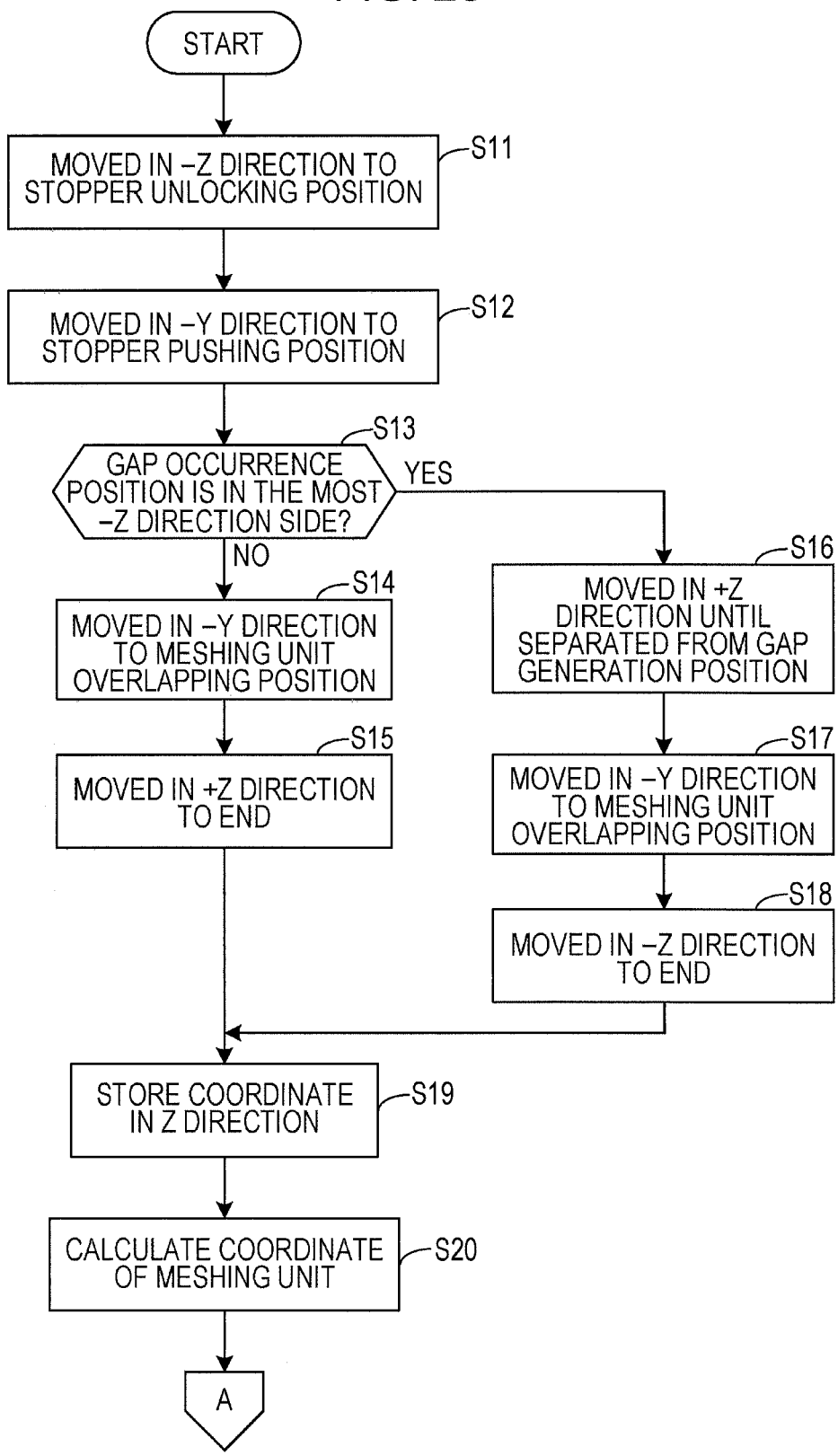
FIG. 26 is a flowchart illustrating a procedure of recovery of the library apparatus according to the second embodiment.
Figure 27:
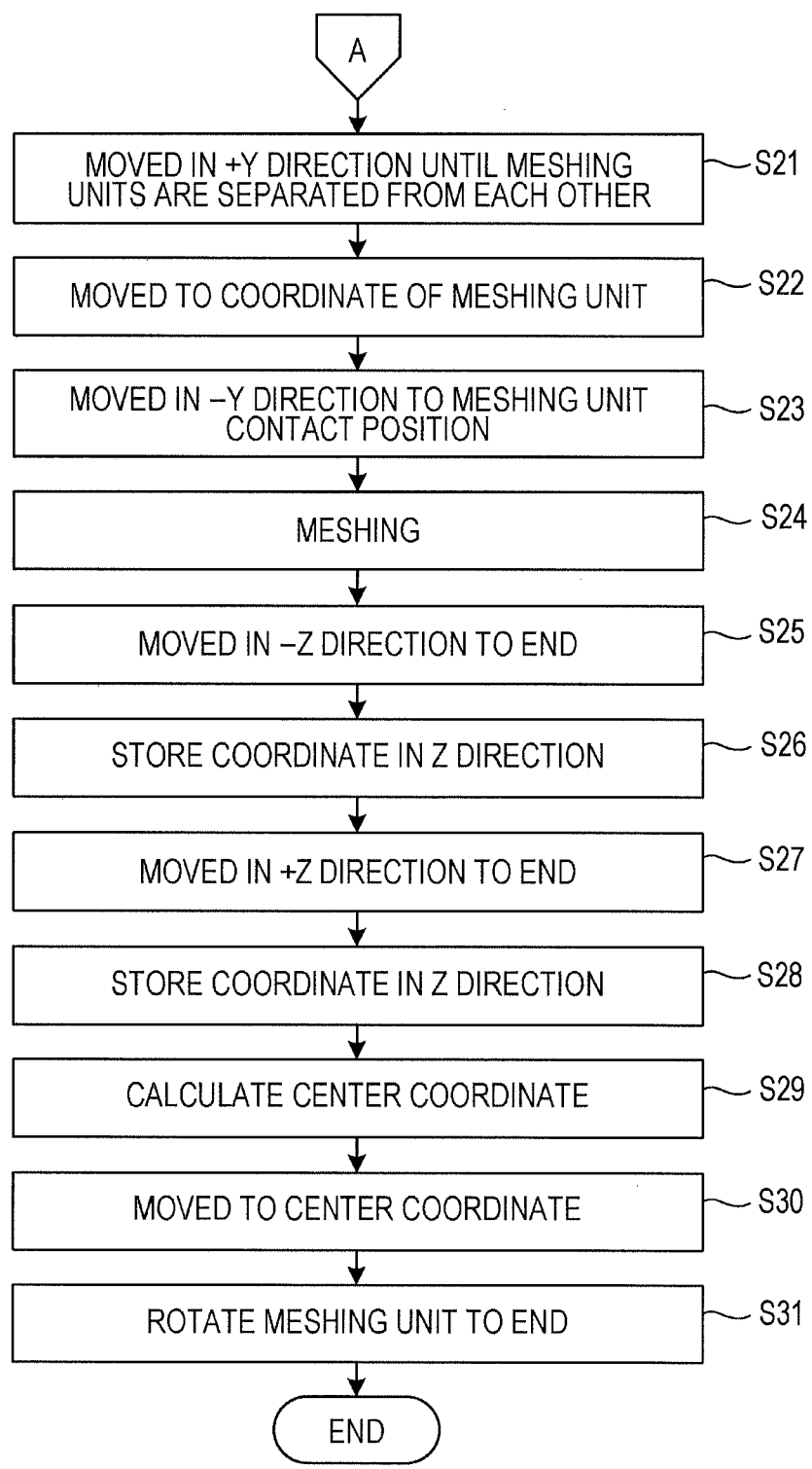
FIG. 27 is a flowchart illustrating the procedure of recovery of the library apparatus according to the second embodiment.

FIGS. 26 and 27 are flowcharts illustrating a procedure of recovery of the library apparatus according to the second embodiment. FIGS. 28A and 28B to FIG. 34 are diagrams illustrating states of movements of the conveying robots according to the second embodiment. The procedure will be described along with the flowcharts of FIGS. 26 and 27 with reference to FIGS. 28A and 28B to FIG. 34.

FIGS. 28A and 28B to FIG. 34 include three views, i.e., a front view, a top view, and a side view. The front view represents the positional relationship between the stopper 23a of the lower conveying robot 15 and the stopper 33a of the upper conveying robot 16 when the library apparatus 10 is viewed from a front side. The top view represents the positional relationship between the hand unit 22 of the lower conveying robot 15 and the hand unit 32 of the upper conveying robot 16 when the library apparatus 10 is viewed from an upper side. The side view represents the positional relationship between the hand unit 22 of the lower conveying robot 15 and the hand unit 32 of the upper conveying robot 16 when the library apparatus 10 is viewed from a right side.

Here, a case where the operation of the hand unit 22 is stopped in a state in which a storage medium is positioned between one of the slots 11a of the storage rack 11 and the hand unit 22 of the lower conveying robot 15, that is, a case where the GAP occurs, will be described. Note that it is determined that the GAP has occurred when information representing the storage medium has not been accommodated in the hand unit 22 by the hand unit 22 or information representing that accommodation of a storage medium to one of the slots has not been completed by the hand unit 22 is detected.

Figure 28A:
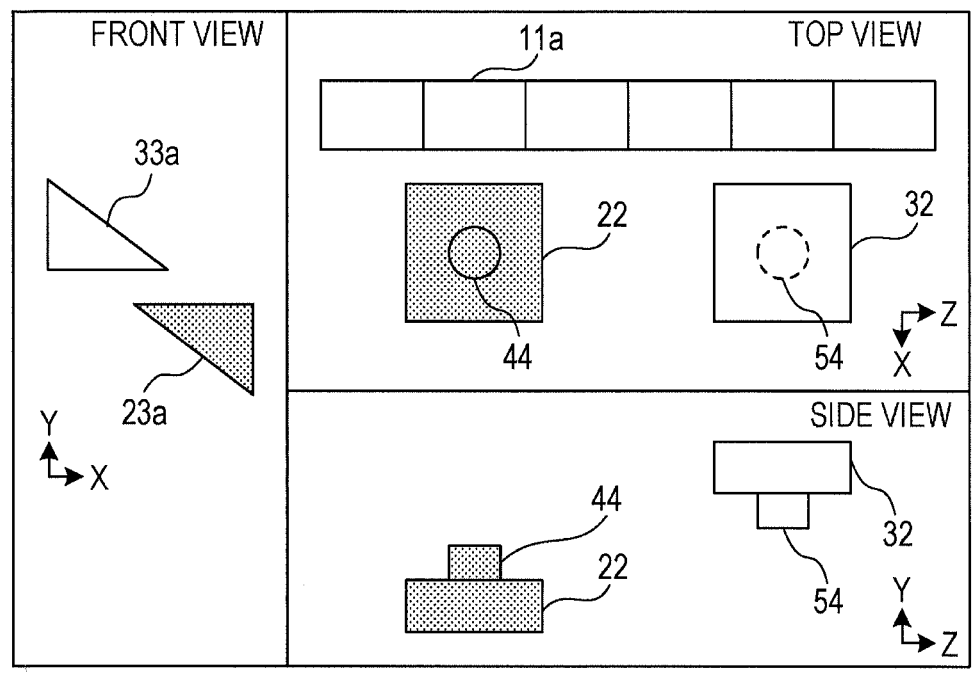
FIGS. 28A and 28B are diagrams illustrating states of movements of the conveying robots according to the second embodiment.

The process illustrated in FIGS. 26 and 27 is started when the controller 70 detects the occurrence of the GAP, for example. The occurrence of the GAP may be detected by monitoring an operation of the hand motor 43f using the controller 70. Note that FIG. 28A represents an initial state.

Figure 28B:
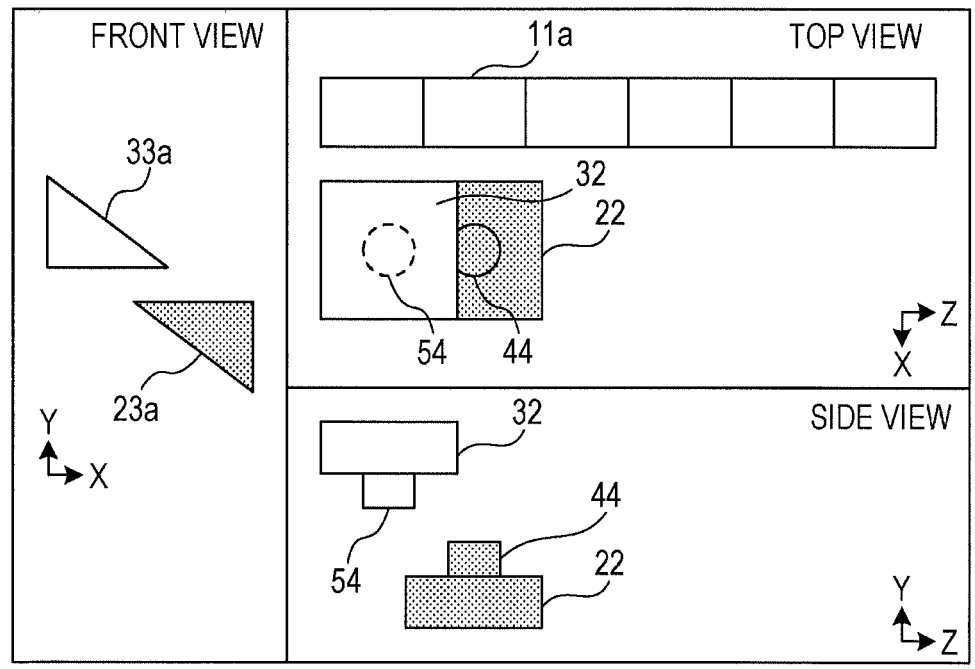

(Step S11) The controller 70 moves the hand unit 32 to a stopper unlocking position in the −Z direction as illustrated in FIG. 28B. By this, the unlocking bar 33b is pushed by the hand unit 32 and the stopper 33a is unlocked. Note that the stopper unlocking position is located on the −Z direction side relative to one of the slots which is located nearest to an end in the −Z direction.

Figure 29A:
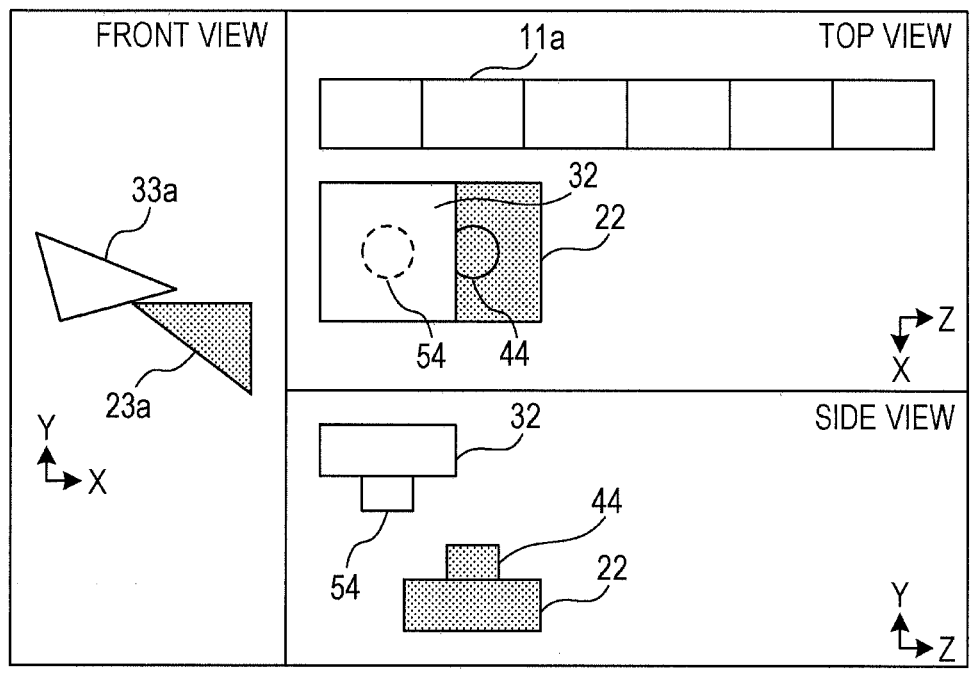
FIGS. 29A and 29B are diagrams illustrating other states of the movements of the conveying robots according to the second embodiment.

(Step S12) The controller 70 moves the hand unit 32 in the −Y direction to a certain position so that the stopper 33a is pressed by the stopper 23a as illustrated in FIG. 29A. In this case, since the stopper 33a is unlocked, the stopper 33a is pushed up by the stopper 23a and rotated. Note that the meshing unit 44 of the hand unit 22 and the meshing unit 54 of the hand unit 32 are separated from each other in the Y direction.

(Step S13) The controller 70 determines whether a position in which the GAP has occurred corresponds to a portion nearest to the end in the −Z direction (the frontmost side). When the position in which the GAP has occurred does not correspond to the portion nearest to the end in the −Z direction (that is, when the determination is negative in step S13), the process of the controller 70 proceeds to step S14. When the position in which the GAP has occurred corresponds to the portion nearest to the end in the −Z direction (that is, when the determination is affirmative in step S13), the process of the controller 70 proceeds to step S16.

Figure 29B:
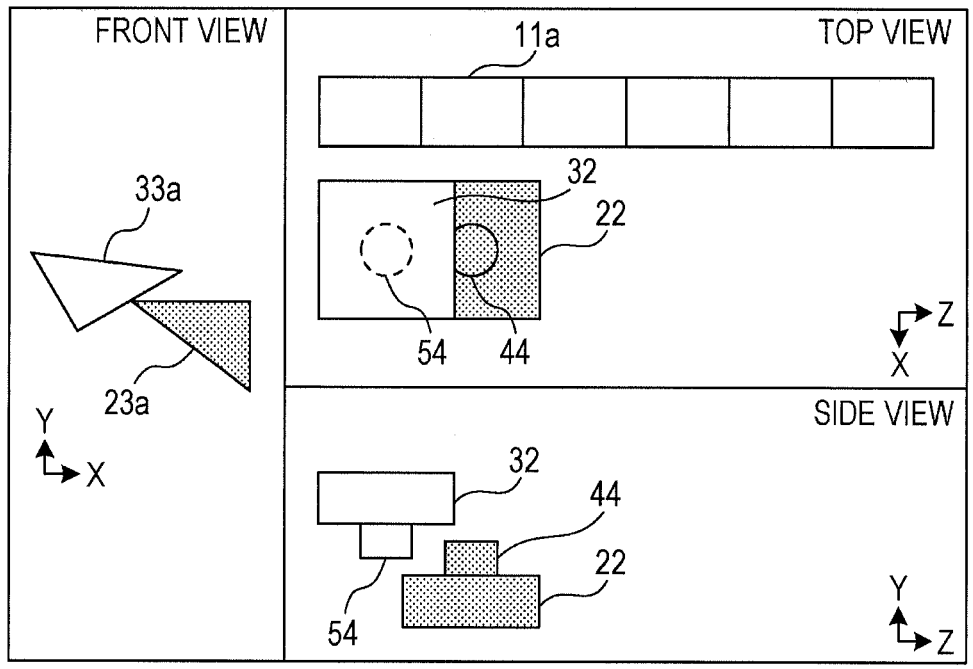

(Step S14) The controller 70 moves the hand unit 32 in the −Y direction so that the meshing unit 44 and the meshing unit 54 overlap with each other in the Y direction as illustrated in FIG. 29B. Specifically, the controller 70 moves the hand unit 32 in the −Y direction to a certain position so that a side of the meshing unit 44 and a side of the meshing unit 54 overlap with each other in the Y direction.

Figure 30A:
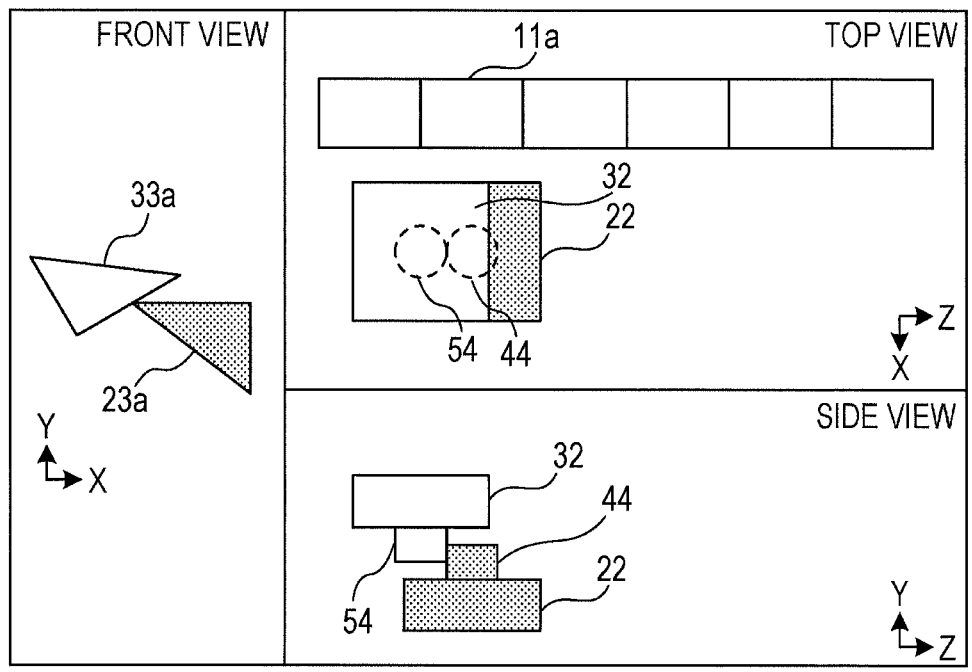
FIGS. 30A and 30B are diagrams illustrating further states of the movements of the conveying robots according to the second embodiment.

(Step S15) The controller 70 moves the hand unit 32 in the +Z direction to an end as illustrated in FIG. 30A. Here, the side of the meshing unit 44 abuts on the side of the meshing unit 54. The controller 70 determines that the meshing unit 44 abuts on the meshing unit 54 when detecting that a cycle of pulse signals output from the Z-direction motor 75c which moves the hand unit 32 in the Z direction becomes long, and stops the movement of the hand unit 32.

(Step S16) When the position in which the GAP has occurred corresponds to the portion nearest to the end in the −Z direction (that is, when the determination is affirmative in step S13), the meshing unit 44 does not abut on the meshing unit 54 by moving the hand unit 32 from the position nearest to the end in the −Z direction toward the +Z direction as described in step S15. Therefore, the controller 70 moves the hand unit 32 in the +Z direction until the hand unit 32 is separated from the GAP occurrence position in the Z direction.

(Step S17) The controller 70 moves the hand unit 32 in the −Y direction to a certain position so that the meshing unit 44 and the meshing unit 54 overlap with each other in the Y direction.

(Step S18) The controller 70 moves the hand unit 32 in the −Z direction to the end. Here, the side of the meshing unit 44 abuts on the side of the meshing unit 54.

(Step S19) The controller 70 stores a coordinate in the Z direction of the hand unit 32.

(Step S20) The controller 70 calculates a coordinate in the Z direction of the meshing unit 44 in accordance with the stored coordinate of the hand unit 32.

Figure 30B:
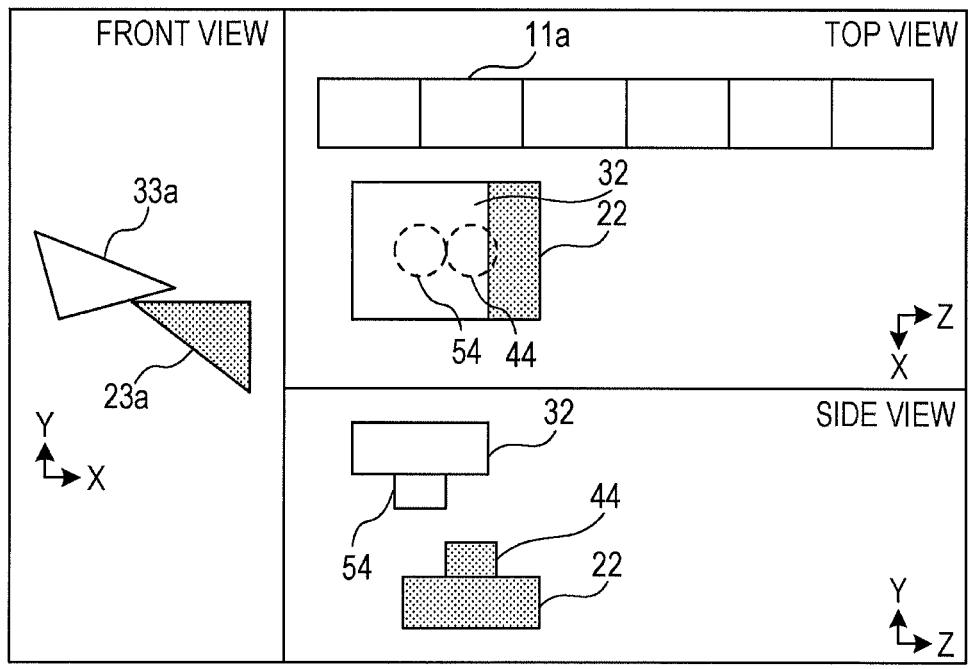

(Step S21) The controller 70 moves the hand unit 32 in the +Y direction to a certain position so that the meshing unit 44 and the meshing unit 54 are separated from each other in the Y direction as illustrated in FIG. 30B.

Figure 31A:
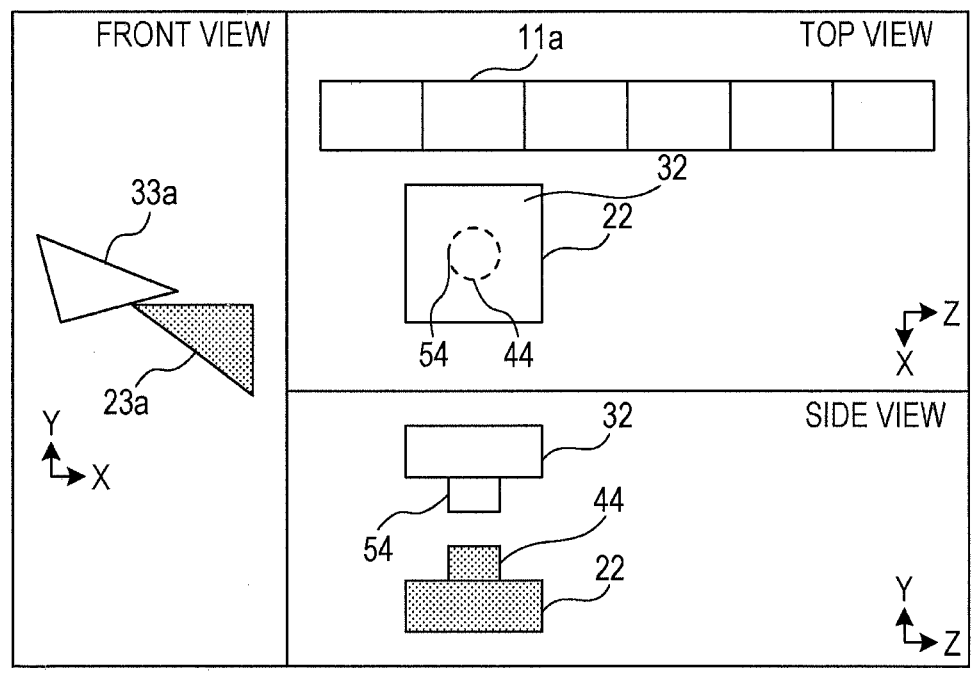
FIGS. 31A and 31B are diagrams illustrating still further states of the movements of the conveying robots according to the second embodiment.

(Step S22) The controller 70 moves the hand unit 32 in the Z direction to a certain position so that the meshing unit 54 is positioned in the coordinate of the meshing unit 44 calculated in step S20 as illustrated in FIG. 31A.

Figure 31B:
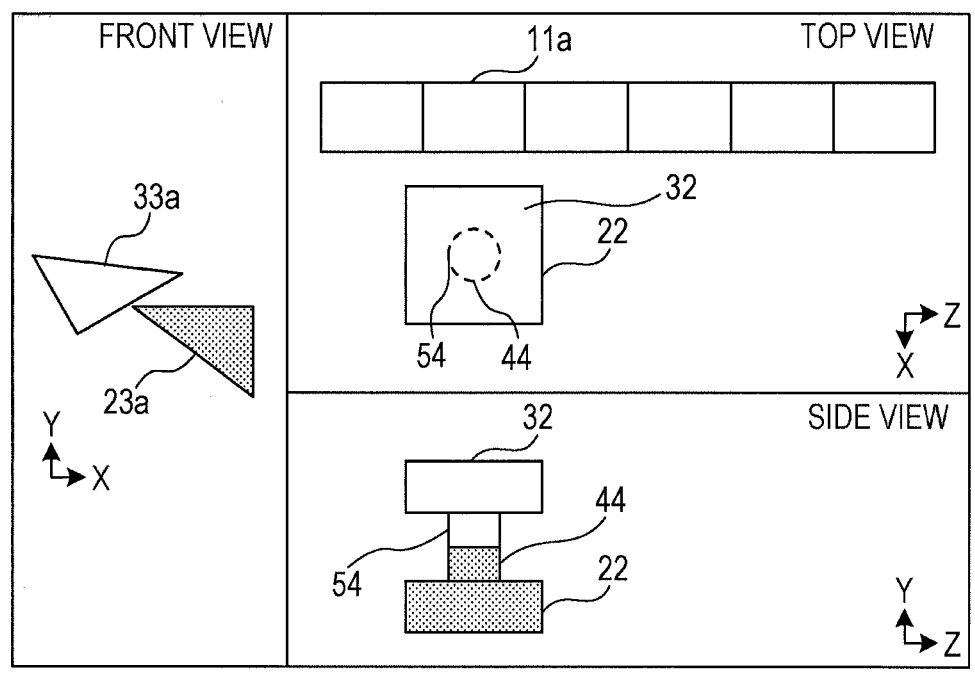

(Step S23) The controller 70 moves the hand unit 32 in the −Y direction to a certain position so that the meshing unit 44 and the meshing unit 54 abut on each other as illustrated in FIG. 31B. The controller 70 determines that the meshing unit 44 has abutted on the meshing unit 54 when detecting that a cycle of pulse signals output from the Y-direction motor 75b which moves the hand unit 32 in the Y direction becomes long, for example.

Figure 32A:
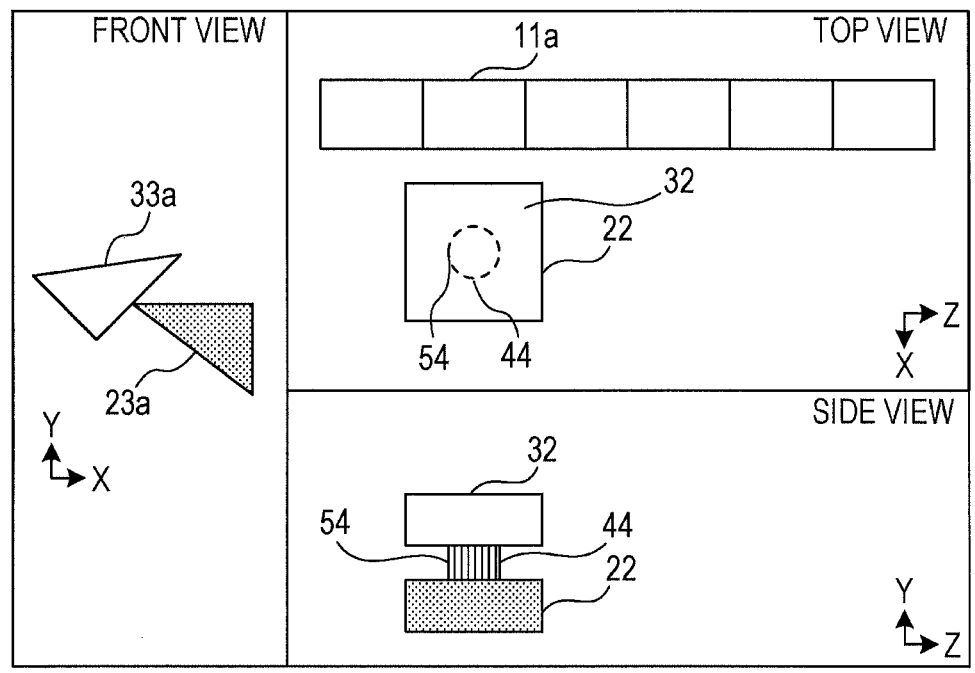
FIGS. 32A and 32B are diagrams illustrating yet further states of the movements of the conveying robots according to the second embodiment.

(Step S24) The controller 70 moves the hand unit 32 to the −Y direction while rotating the meshing unit 54. Thereafter, the controller 70 determines that the hand unit 32 comes to an end in the −Y direction when detecting stop of output of pulse signals from the Y-direction motor 75b, and stops the movement of the hand unit 32 in the −Y direction and the rotation of the meshing unit 54. By this, the meshing unit 44 meshes with the meshing unit 54 as illustrated in FIG. 32A.

Figure 32B:
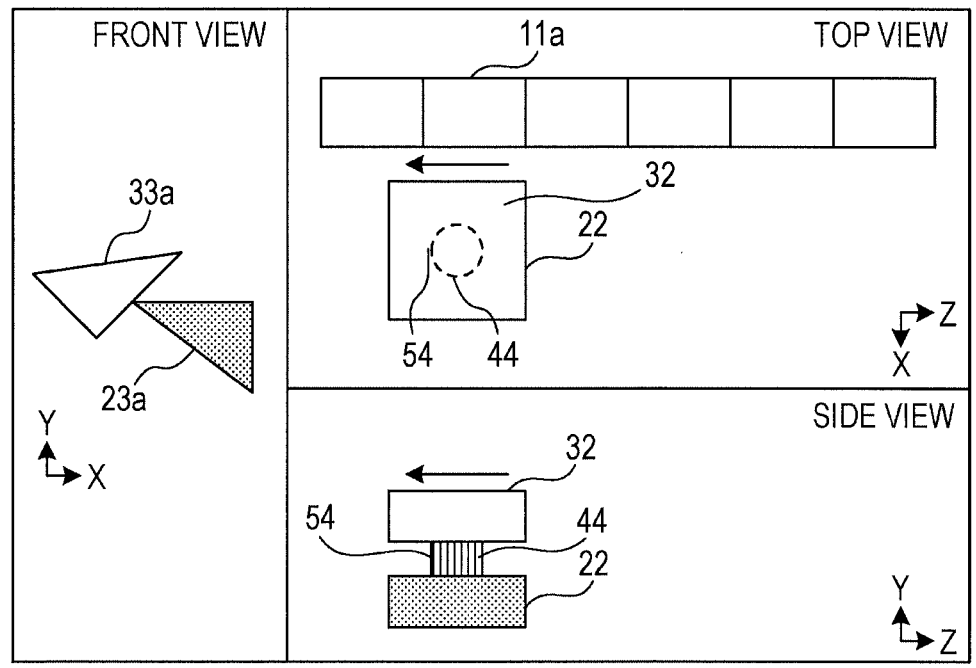

(Step S25) The controller 70 moves the hand unit 32 in the −Z direction as illustrated in FIG. 32B. Since the storage medium is positioned between the hand unit 22 and one of the slots 11a, the movement of the hand unit 32 in the −Z direction is limited by a certain position. When detecting that the hand unit 32 comes to the end, the controller 70 stops the movement of the hand unit 32 in the −Z direction.

(Step S26) The controller 70 stores a coordinate in the Z direction of the hand unit 32.

Figure 33A:
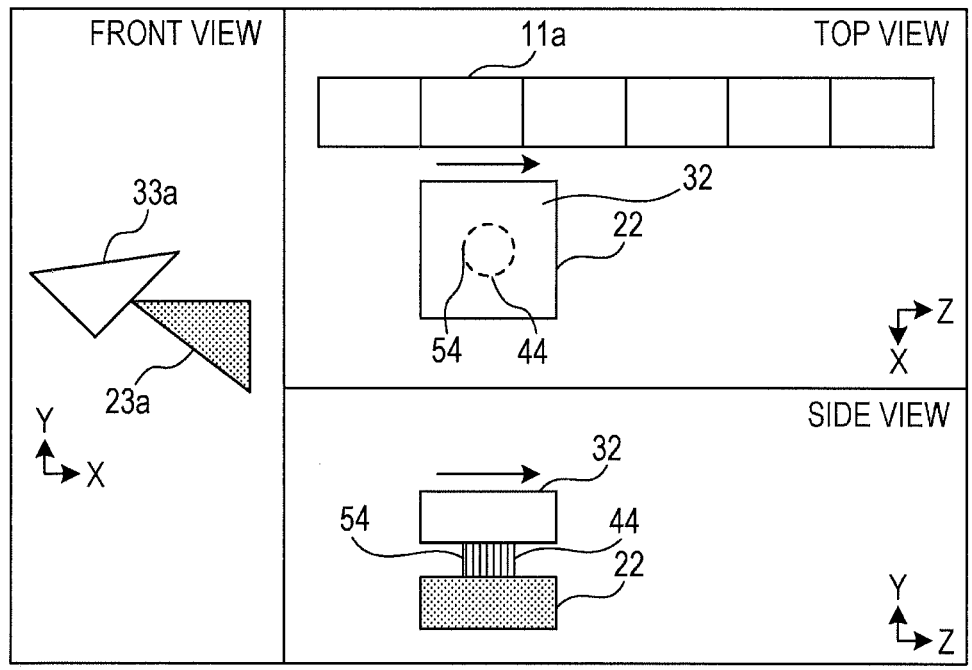
FIGS. 33A and 33B are diagrams illustrating yet further states of the movements of the conveying robots according to the second embodiment.

(Step S27) The controller 70 moves the hand unit 32 in the +Z direction to an end as illustrated in FIG. 33A. Since the storage medium is positioned between the hand unit 22 and one of the slots 11a, the movement of the hand unit 32 in the +Z direction is also limited by a certain position. When detecting that the hand unit 32 comes to the other end, the controller 70 stops the movement of the hand unit 32 in the +Z direction.

(Step S28) The controller 70 stores a coordinate in the Z direction of the hand unit 32.

(Step S29) The controller 70 calculates a center coordinate between the coordinate stored in step S26 and the coordinate stored in step S28. Here, the calculated center coordinate represents a center coordinate of one of the slots 11a.

Figure 33B:
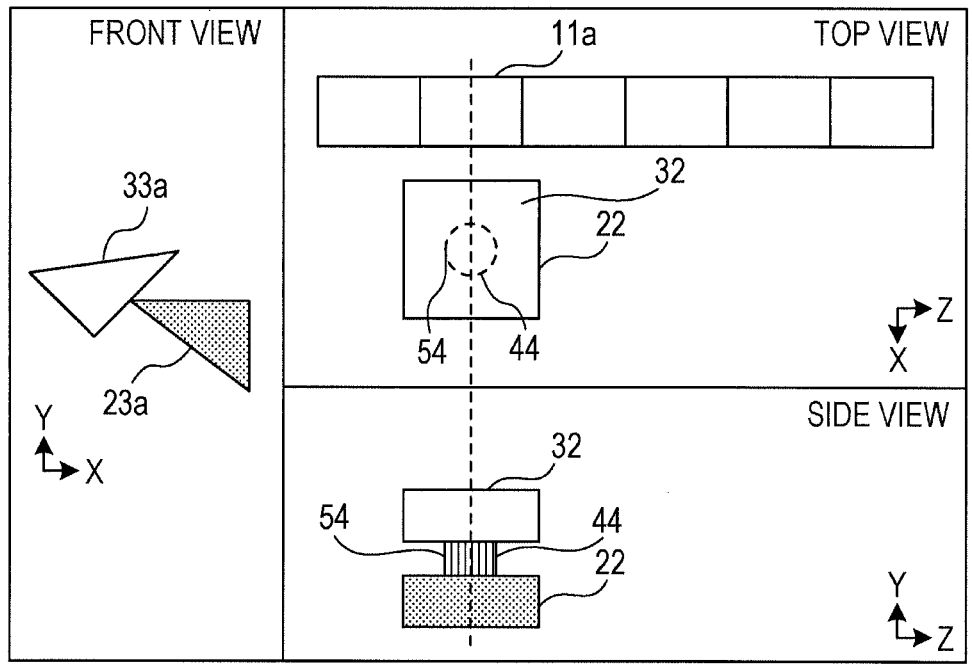

(Step S30) The controller 70 moves the hand unit 32 in the Z direction to a certain position so that a center of the hand unit 32 is positioned in the calculated center coordinate as illustrated in FIG. 33B.

(Step S31) The controller 70 rotates the hand unit 54 until an end is detected. By this, the meshing unit 44 is also rotated and the hand 43 of the hand unit 22 is driven, and accordingly, the storage medium is stored in the slots 11a. Note that, when it is determined that the hand unit 22 normally inserts or extracts the storage medium, the storage medium may be stored in the accommodation unit of the hand unit 22.

By this, since possibility for breakdown of the storage medium due to the movement of the lower conveying robot 15 is considerably reduced, the lower conveying robot 15 may be moved to the escape area 17 by being pushed by the upper conveying robot 16. Alternatively, the lower conveying robot 15 may be moved to the escape area 17 by driving the Y-direction motor 75g. Thereafter, the upper conveying robot 16 conveys storage media. The recovery from the GAP is performed in this way. Furthermore, the lower conveying robot 15 which is escaped may be inspected so that it is determined whether a failure has occurred in the lower conveying robot 15.

Figure 34:
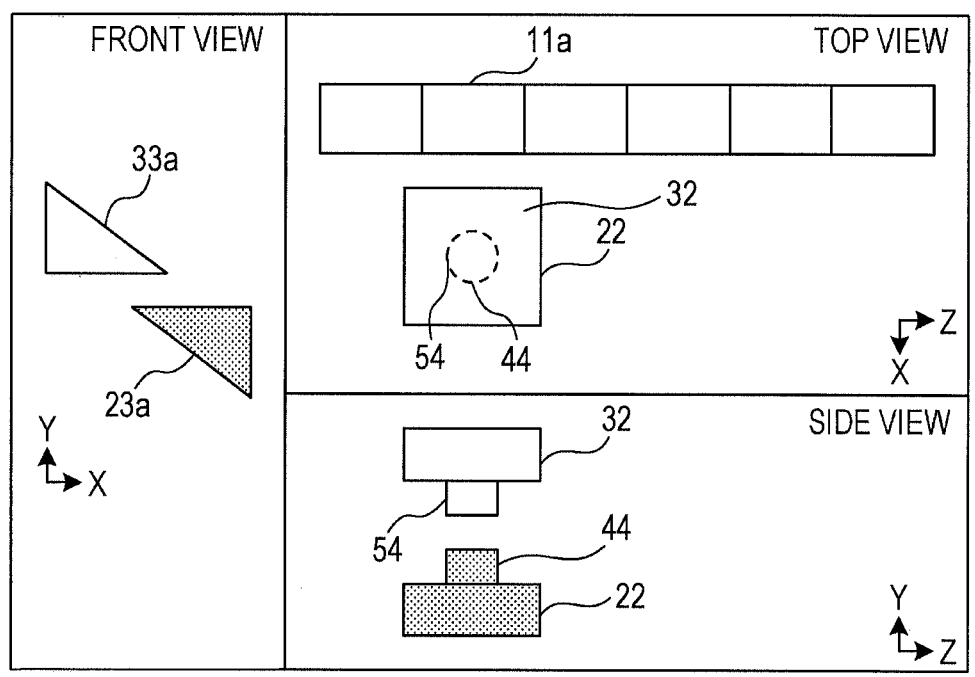
FIG. 34 is diagram illustrating yet further state of the movement of the conveying robots according to the second embodiment.

Note that, when the hand unit 22 is recovered from a stop state to a movable state in step S31, the hand unit 32 may be moved in the +Y direction so that the stopper 23a and the stopper 33a are separated from each other as illustrated in FIG. 34 and thereafter the lower conveying robot 15 may convey the storage medium.

Note that, when the GAP is not recovered even when the process from step S21 to step S31 is executed, the process from step S21 to step S31 is executed again. However, the number of repetition of the process from step S21 to step S31 is limited to two, for example.

According to the second embodiment, when a first hand unit is stopped due to occurrence of the GAP, the first hand unit may be recovered from the GAP occurrence state by driving a second hand unit. Since the second hand unit adjusts a position of the first hand unit which is stopped so that the first hand unit faces a slot, a storage medium may be reliably attached and detached. Furthermore, although a driving mechanism of the stopped first hand unit fails due to an occurrence of the GAP in some cases, a recovery process may be reliably performed by executing attachment and detachment of the storage medium using the stopped hand unit by transmitting driving force of the second hand unit to the stopped first hand unit. Furthermore, contact between the hand units is suppressed by lock of stoppers, and the hand units are allowed to abut on each other only when the stoppers are unlocked in an abnormal state. Accordingly, possibility for breakdown of the hand units may be reduced in a normal operation.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A library apparatus comprising:
   a storage rack configured to store a plurality of storage media;
   a recording-reproducing device configured to perform writing of data to the storage media and reading of data from the storage media;
   a first movement device configured to include,
   a first attachment-detachment mechanism that inserts a storage medium to and extracts the storage medium from the storage rack or the recording-reproducing device,
   a first driving unit that supplies first driving force to the first attachment-detachment mechanism, and
   a first coupling unit that transmits second driving force to the first attachment-detachment mechanism; and
   a second movement device configured to include,
   a second coupling unit that transmits third driving force to the first coupling unit when the second coupling unit is coupled with the first coupling unit, and
   a second driving unit that supplies fourth driving force to the second coupling unit.

2. The library apparatus according to claim 1,
wherein the second movement device includes a second attachment-detachment mechanism including a function the same as that of the first attachment-detachment mechanism, and
the second driving unit supplies the fourth driving force to the second attachment-detachment mechanism and the second coupling unit.

3. The library apparatus according to claim 1,
wherein at least one of the first and second movement devices includes a stopper that maintains a predetermined distance or more between the first and second movement devices as a gap and a lock mechanism that locks the stopper and includes an unlocking function.

4. The library apparatus according to claim 3, further comprising a controller, the controller configured to cause the lock mechanism to enter an unlocked state and then to move the second movement device so that the first and second coupling units are coupled with each other to drive the second driving unit so that the first attachment-detachment mechanism performs an attachment-detachment operation, when the controller detects that the storage-medium attachment-detachment operation performed by the first attachment-detachment mechanism is interrupted.

5. The library apparatus according to claim 4,
wherein the first and second movement devices are movable along a reference axis which is parallel to the storage rack,
the stopper maintains the predetermined distance or more between the first and second movement devices as the gap in a direction of the reference axis when the lock mechanism is in a lock state, and
the controller unlocks the lock mechanism when the controller detects that the storage-medium attachment/detachment operation performed between the first attachment-detachment mechanism and the storage rack by the first attachment-detachment mechanism is interrupted, and moves the second movement device toward the first movement device along the reference axis so that the first and second coupling units are coupled with each other.

6. The library apparatus according to claim 5,
wherein the first and second movement devices are movable along a vertical axis that is parallel to the storage rack and is orthogonal to the reference axis, and
the lock mechanism enters the unlocked state when the second movement device is located in a predetermined position in a direction of the vertical axis.

7. The library apparatus according to claim 6,
wherein, when the library apparatus detects that the storage-medium attachment-detachment operation performed between the first attachment-detachment mechanism and the storage rack by the first attachment detachment mechanism of the first movement device is interrupted, the controller unlocks the lock mechanism, moves the second movement device so that the first and second coupling units are coupled with each other, moves the second movement device in the direction of the vertical axis, and positions the first movement device to an accommodation unit which stores the storage medium in the storage rack, and drives the second driving unit in a state in which the first and second coupling units are coupled with each other so that the first attachment-detachment mechanism of the first movement device executes the attachment-detachment operation.

8. A method for controlling conveying of a storage medium executed by a library apparatus including a storage rack which stores a plurality of storage media, a recording-reproducing device that performs writing of data to the storage media and reading of data from the storage media, and a first movement device that includes an attachment-detachment mechanism that inserts a storage medium to the storage rack or the recording-reproducing device and that extracts a storage medium from the storage rack or the recording-reproducing device and a first driving unit that supplies driving force to the attachment-detachment mechanism, the method comprising:
detecting that a storage-medium attachment-detachment operation performed by the attachment-detachment mechanism of the first movement device is interrupted;
moving a second movement device including a first coupling unit and a second driving unit that supplies first driving force to the first coupling unit toward the first movement device so that the first coupling unit included in the second movement device is coupled with a second coupling unit that is included in the first movement device and which transmits second driving force to the attachment-detachment mechanism which is different from the first driving force supplied from the first driving unit; and
driving the second driving unit so that the attachment-detachment mechanism of the first movement device executes the attachment-detachment operation.

9. The method for controlling conveying of a storage medium according to claim 8, further comprising:
unlocking a lock mechanism of a stopper that is disposed at least one of the first and second movement devices and which maintains a predetermined distance or more between the first and second movement devices as a gap, when it is determined that the storage-medium attachment-detachment operation performed by the attachment-detachment mechanism of the first movement device is interrupted; and
moving the second movement device toward the first movement device so that the first coupling unit is coupled with the second coupling unit.

10. The method for controlling conveying of a storage medium according to claim 9, comprising:
unlocking the lock mechanism when it is determined that the storage-medium attachment/detachment operation performed by the attachment-detachment mechanism of the first movement device is interrupted; and
moving the second movement device toward the first movement device along a reference axis which is parallel to the storage rack so that the first coupling unit is coupled with the second coupling unit.

11. The method for controlling conveying of a storage medium according to claim 10, comprising:
moving the second movement device to a predetermined position in a vertical axis which is parallel to the storage rack and which is orthogonal to the reference axis so that the lock mechanism is unlocked, when it is determined that the storage-medium attachment-detachment operation performed by the attachment/detachment mechanism of the first movement device is interrupted; and
moving the second movement device toward the first movement device along the reference axis so that the first coupling unit is coupled with the second coupling unit.

12. The method for controlling conveying of a storage medium according to claim 11, comprising:
unlocking the lock mechanism when it is determined that the storage-medium attachment/detachment operation performed by the attachment-detachment mechanism of the first movement device is interrupted;

moving the second movement device so that the first and second coupling units are coupled with each other and positioning the first movement device in a direction of the vertical axis by moving the second movement device in the direction of the vertical axis; and driving the second driving unit in a state in which the first and second coupling units are coupled with each other so that the attachment-detachment mechanism of the first movement device executes the attachment-detachment operation.

* * * * *